(12) United States Patent
Yung et al.

(10) Patent No.: US 9,118,631 B1
(45) Date of Patent: Aug. 25, 2015

(54) MIXING SECURE AND INSECURE DATA AND OPERATIONS AT SERVER DATABASE

(71) Applicant: GOOGLE INC., Mountain View, CA (US)

(72) Inventors: Marcel M. M. Yung, New York, NY (US); Sarvar Patel, Montville, NJ (US); Binyamin Pinkas, New York, NY (US)

(73) Assignee: GOOGLE INC., Mountain View, CA (US)

( * ) Notice: Subject to any disclaimer, the term of this patent is extended or adjusted under 35 U.S.C. 154(b) by 151 days.

(21) Appl. No.: 13/969,340

(22) Filed: Aug. 16, 2013

(51) Int. Cl.
*H04L 29/06* (2006.01)
*H04L 9/00* (2006.01)
*G06F 21/42* (2013.01)
*G06F 21/62* (2013.01)

(52) U.S. Cl.
CPC ............ *H04L 63/0428* (2013.01); *G06F 21/42* (2013.01); *G06F 21/6227* (2013.01); *H04L 9/008* (2013.01)

(58) Field of Classification Search
CPC ..... H04L 9/008; H04L 63/0428; G06F 21/42; G06F 21/6245; G06F 21/72; G06F 21/74; G06F 21/6227
See application file for complete search history.

(56) References Cited

U.S. PATENT DOCUMENTS

| | | | |
|---|---|---|---|
| 6,785,810 B1 * | 8/2004 | Lirov et al. | 713/165 |
| 7,627,534 B2 | 12/2009 | Donovan et al. | |
| 8,069,349 B1 | 11/2011 | Israel et al. | |
| 8,429,421 B2 * | 4/2013 | Chase et al. | 713/189 |
| 8,473,740 B2 * | 6/2013 | Vion-Dury | 713/167 |
| 2002/0004784 A1 | 1/2002 | Forbes et al. | |
| 2002/0104002 A1 * | 8/2002 | Nishizawa et al. | 713/168 |
| 2005/0004924 A1 * | 1/2005 | Baldwin | 707/100 |
| 2010/0146299 A1 * | 6/2010 | Swaminathan et al. | 713/189 |
| 2010/0246812 A1 * | 9/2010 | Rane et al. | 380/28 |
| 2011/0302410 A1 | 12/2011 | Clarke et al. | |
| 2012/0159180 A1 * | 6/2012 | Chase et al. | 713/183 |
| 2013/0173917 A1 * | 7/2013 | Clifton et al. | 713/167 |
| 2013/0191650 A1 * | 7/2013 | Balakrishnan et al. | 713/190 |

OTHER PUBLICATIONS

Paillier Cryptosystem, Wikipedia, Feb. 25, 2013, 5 pages [online] [retrieved on Aug. 14, 2013] URL: http://en.wikipedia.org/wiki/Paillier_cryptosystem.
Two's Complement, Wikipedia, Aug. 8, 2013, 10 pages, [online] [retrieved on Aug. 14, 2013] URL: http://en.wikipedia.org/wiki/Two%27s_complement.

\* cited by examiner

*Primary Examiner* — Harunur Rashid
*Assistant Examiner* — Sher Khan
(74) *Attorney, Agent, or Firm* — Procopio, Cory, Hargreaves & Savitch LLP

(57) ABSTRACT

Processing a query, includes, at a client, receiving a user-generated query having a plurality of recognizable terms, securing the user-generated query to generate an encrypted query, so that the plurality of recognizable terms generated by the user-generated query cannot be determined by a server, transmitting the encrypted query to the server, to perform the query on encrypted data comprising a mix of regular data and secure data previously provided by the client, wherein at least one of selection criteria of the query and identifies of selected records of the query result cannot be determined by the server, and interpreting a result of the query provided by the server, and providing an output of the query to the user having the plurality of recognizable terms.

16 Claims, 13 Drawing Sheets cars.schema" an example of Extended schema.

[
{"name": "Year", "type": "integer", "mode": "required", "encrypt": "none"},
{"name": "Make", "type": "string", "mode": "required", "encrypt": "pseudonym"},
{"name": "Model", "type": "string", "mode": "required", "encrypt": "probabilistic_searchwords"},
{"name": "Description", "type": "string", "mode": "nullable", "encrypt": "searchwords"},
{"name": "Website", "type": "string", "mode": "nullable", "encrypt": "searchwords", "searchwords_separator": "/"},
{"name": "Price", "type": "float", "mode": "required", "encrypt": "probabilistic"},
{"name": "Invoice_Price", "type": "integer", "mode": "required", "encrypt": "homomorphic"},
]

FIG. 3 cars.csv
1997, Ford, E350, "ac\xc4a\x87, abs, moon", "http://www.ford.com", 3000.00, 2000, 1.2
1999, Chevy, "Venture """Extended Edition"""", "www.chevrolet.com", 4900.00, 3800, 2.3
1999, Chevy, "Venture """"Extended Edition, Very Large"""", "www.chevrolet.com", 5000.00, 4300, 1.9
1996, Jeep, Grand Cherokee, "MUST SELL! air, moon roof, loaded", "www.chrysler.com/jeep/grand-cherokee", 4799.00, 3950, 2.4

FIG. 4

```
              converted schema
{
    {
        "type": "integer",
        "name": "Year",
        "mode": "required"
    },
    {
        "type": "string",
        "name": "PSEUDONYM_Make",
        "mode": "required"
    },
    {
        "type": "string",
        "name": "PROBABILISTIC_Model",
        "mode": "required"
    },
    {
        "type": "string",
        "name": "SEARCHWORDS_Model",
        "mode": "required"
    },
    {
        "type": "string",
        "name": "SEARCHWORDS_Description",
        "mode": "nullable"
    },
    {
        "type": "string",
        "name": "SEARCHWORDS_Website",
        "mode": "nullable"
    },
    {
        "type": "string",
        "name": "PROBABILISTIC_Price",
        "mode": "required"
    },
    {
        "type": "integer",
        "name": "HOMOMORPHIC_INT_Invoice_Price",
        "mode": "required"
    }
}
```

FIG. 5

MIXING SECURE AND INSECURE DATA AND OPERATIONS AT SERVER DATABASE

BACKGROUND

1. Field

The subject matter discussed herein relates generally to data processing and, more particularly, to mixing of secure and insecure operations at the server such that the server cannot determine secure data and cannot determine the query, and further, homomorphic cryptography on numerical values in digital computing as may applied on the query and query results at the client side.

2. Related Background

In the related art, a database, database as service, or cloud database operation may be performed. More specifically, the database server may holds the data of the user (e.g., user transport data), and the user may perform an operation on the data (e.g., a query). The user may have data which is sensitive, which he or she does not want the server (e.g., cloud owner) to know.

However, the user also may have much more data that he or she wants to load into the server. The user may want all of the data, regardless of level of sensitivity, to reside within the same database. Accordingly, if the data resides together, the operations at the server as well as at the client by the user needs to include "secure data" (e.g., "encrypted data") operations. Both data transport and addition and deletion must handle both types (e.g., secure and insecure) and queries must be also performed over mixed data. In the related art, a secure (e.g., encrypted) database may be provided in its entirety, but not over mixed data, and not as augmenting a given engine.

The related art approach may lose its security over time, and there is thus a need to retain security and not reduce security as queries are performed.

Additionally, homomorphic cryptography, such as Paillier cryptography, includes many properties. For example, given two values V1 and V2 (referred to as plaintexts), E(V1)=C1 (i.e., encrypting V1 resulting the ciphertext C1) and E(V2)=C2. One of the properties of homomorphic cryptography is that the product of two ciphertexts C1 and C2 will decrypt to the sum of their corresponding plaintexts V1 and V2.

However, homomorphic cryptography and its properties cannot be used on many numerical values as currently represented in digital computing.

SUMMARY

The subject matter includes, according to an aspect, a computer-implemented method of processing a query is provided, comprising at a client, receiving a user-generated query having a plurality of recognizable terms, securing the user-generated query to generate an encrypted query, so that the plurality of recognizable terms generated by the user-generated query cannot be determined by a server, transmitting the encrypted query to the server, to perform the query on encrypted data comprising a mix of regular data and secure data previously provided by the client, wherein at least one of selection criteria of the query and identifies of selected records of the query result cannot be determined by the server, and interpreting a result of the query provided by the server, and providing an output of the query to the user having the plurality of recognizable terms.

According to another aspect, a computer-implemented method of processing a query is provided, comprising at a server, receiving an encrypted query provided by a client, wherein recognizable terms generated of the user-generated query cannot be determined by a server, performing the query on encrypted data comprising a mix of regular data and secure data previously provided by the client, and providing a result of the query to the client, wherein at least one of selection criteria of the query and identifies of selected records of the query result cannot be determined by the server.

According to yet another aspect, a non-transitory computer readable medium is provided, having stored therein computer executable instructions for receiving a user-generated query having a plurality of recognizable terms, securing the user-generated query to generate an encrypted query, so that the plurality of recognizable terms generated by the user-generated query cannot be determined by a server, transmitting the encrypted query to the server, to perform the query on encrypted data comprising a mix of regular data and secure data previously provided by the client, wherein at least one of selection criteria of the query and identifies of selected records of the query result cannot be determined by the server, and interpreting a result of the query provided by the server, and providing an output of the query to the user having the plurality of recognizable terms.

According to a still further aspect, a non-transitory computer readable medium is provided, having stored therein computer executable instructions for receiving an encrypted query provided by a client, wherein recognizable terms generated of the user-generated query cannot be determined by a server, performing the query on encrypted data comprising a mix of regular data and secure data previously provided by the client, and providing a result of the query to the client, wherein at least one of selection criteria of the query and identifies of selected records of the query result cannot be determined by the server.

According to yet another aspect, a computer-implemented method of processing a query is provided, comprising at a client, receiving a user-generated query having a plurality of recognizable terms, securing the user-generated query to generate an encrypted query, so that the plurality of recognizable terms generated by the user-generated query cannot be determined by a server, transmitting the encrypted query to the server, to perform the query on encrypted data comprising a mix of regular data and secure data previously provided by the client, wherein at least one of selection criteria of the query and identifies of selected records of the query result cannot be determined by the server; at a server, receiving an encrypted query provided by a client, wherein recognizable terms generated of the user-generated query cannot be determined by a server, performing the query on encrypted data comprising a mix of regular data and secure data previously provided by the client, providing a result of the query to the client, wherein at least one of selection criteria of the query and identifies of selected records of the query result cannot be determined by the server; and at the client, interpreting a result of the query provided by the server, and providing an output of the query to the user having the plurality of recognizable terms.

According to still a further aspect, a query processing system is provided, comprising a client module configured to, receive a user-generated query having a plurality of recognizable terms, secure the user-generated query to generate an encrypted query, so that the plurality of recognizable terms generated by the user-generated query cannot be determined by a server, and transmit the encrypted query to the server, to perform the query on encrypted data comprising a mix of regular data and secure data previously provided by the client, wherein at least one of selection criteria of the query and identifies of selected records of the query result cannot be determined by the server; a server module configured to, receive an encrypted query provided by a client, wherein recognizable terms generated of the user-generated query cannot be determined by a server, perform the query on encrypted data comprising a mix of regular data and secure data previously provided by the client, and provide a result of the query to the client, wherein at least one of selection criteria of the query and identifies of selected records of the query result cannot be determined by the server; and the client further configured to, interpret a result of the query provided by the server, and providing an output of the query to the user having the plurality of recognizable terms.

The methods may be implemented using one or more computing devices and/or systems. The methods may be stored in computer-readable media.

BRIEF DESCRIPTION OF THE DRAWINGS

FIGS. 3-5 show an example query implemented by the example operations.

DETAILED DESCRIPTION

The subject matter described herein is taught by way of example implementations. Various details have been omitted for the sake of clarity and to avoid obscuring the subject matter. The examples below are directed to structures and functions for performing a query on mixed data based on a request from a client, while not permitting the server to determine the actual values of the queries or the data provided by the user at the client.

According to an example implementation, data may be stored at the server in encrypted form, while supporting a subset of client query types that are typically supported by the server, maintaining scalable performance, and keeping the client data and the content of the queries hidden from the server. Further, the examples shown below are directed to structures and functions for implementing homomorphic cryptography on numerical values in digital computing, e.g., at the client side to encrypt the query of the user.

Architecture

Figure 1:
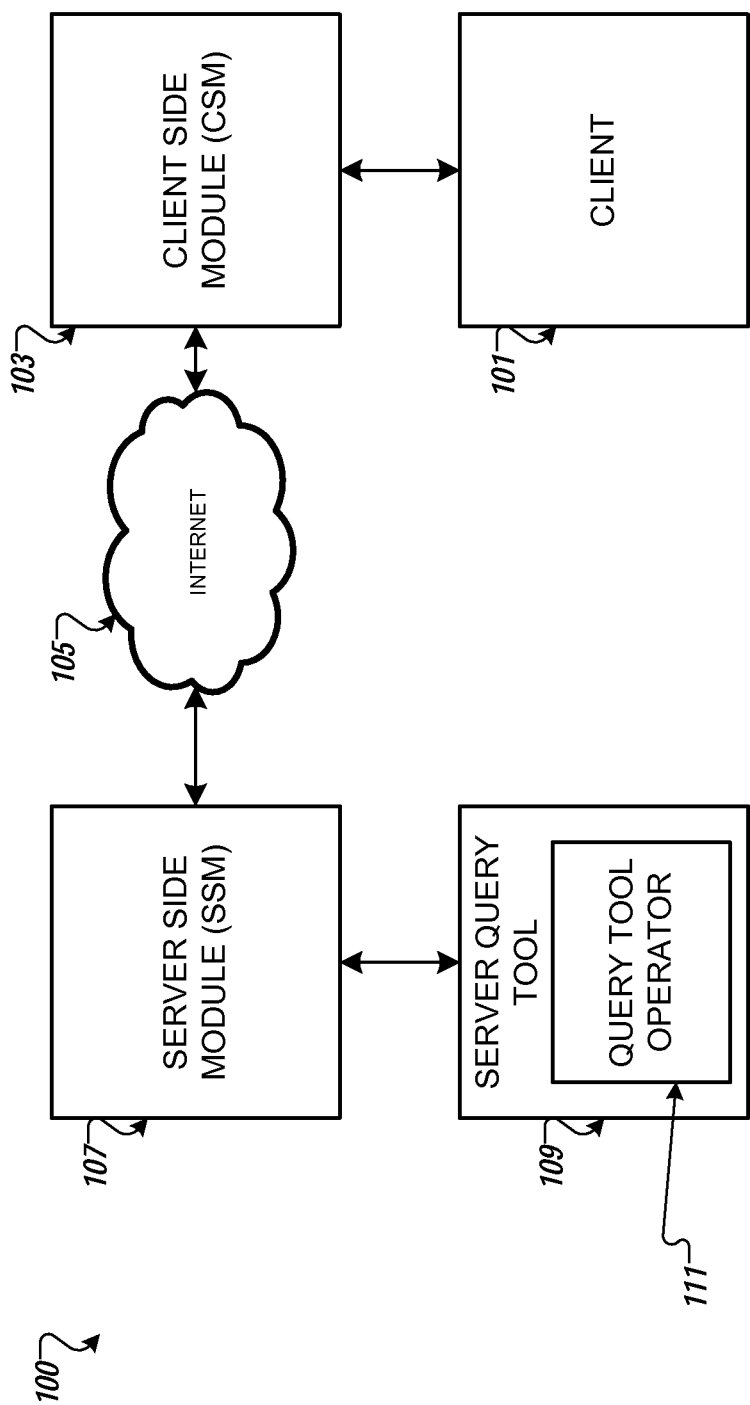
FIG. 1 shows an example implementation of an architecture.

FIG. 1 illustrates an example architecture 100. More specifically, a client 101 is provided that may interface with a user. The user may perform a data import to add the data as an offline process, or a process that need not occur during the query process. For example, but not by way of limitation, the client 101 may include a processor, a memory, a user input device, and user output device.

The client 101 provides an output to the client side module (CSM) 103, which performs a securing process on the received input. More specifically, the CSM 103 may receive a query from the client 101, and may encrypt the query in such a manner that a server receiving the encrypted query cannot know the contents of the encrypted query. For example, the server cannot decrypt the query, as explained below.

It should be noted that the client 101 is not limited to a single client unit, but may include multiple clients (e.g., a plurality of clients). The plurality of clients may be commonly coupled to a single CSM 103 in a many-to-one relation, or to respective CSMs in a many-to-many relationship.

A server side module (SSM) 105 is the server that receives the query from the CSM 103 in an encrypted form, via the Internet 105. The SSM 105 also contains data previously input from the client 101 via the CSM 103. The data may include secure information as well as regular data, imported to the SSM 105 at an earlier time, e.g., offline.

The encrypted query is further processed by a server query tool 109. The server query tool 109 includes a query tool operator 111, which provides functions required for the processing of the query as related to its encrypted status.

According to an aspect of the example implementations, the SSM 103 is augmented by the addition of a database engine (e.g., the server query tool 109). The functionality of a security (e.g., cryptographic) component is provided at the CSM 103 of the user at the user. Moreover, minimal changes are required to the engine of the server (e.g., crypto-related functions in the query tool operator 111.

The CSM 103 is configured to interface with existing databases and user facing databases, and can be provided to a user as an add-on, such that the user (e.g., enterprise) can load all of their data into a cloud server (e.g., SSM 107), while keeping at least some of the data hidden from the cloud provider (e.g., SSM 107). On the other hand, the server continues to be able to perform a database operation, e.g., ["select" record where "field=value"] or a query, e.g., [sum of all salaries of workers where rank=manager]. Such server-side operations may be performed while not sacrificing the security of the data items themselves, so the server cannot determine anything more about the individual data items than could be determined based on the initial presentation of items as encrypted values via the CSM 103.

The CSM 103 has two separate roles: data import, which is done offline and quite rarely; and querying, which is done interactively. The CSM 103 modifies imported client data and client queries before sending them to the SSM 107. The CSM 103 owns a key, or a set of keys, which will be unknown to the SSM 107 running the database.

During data import, the CSM 103 encrypts the data and adds additional fields as required to support queries on the encrypted data (this may be done offline, i.e., before queries are provided to the server).

During queries, the CSM 103 modifies the query so that (1) the modified query can perform the desired functionality on the encrypted data, and (2) the original query is hidden from the SSM 107. After receiving the answer from the SSM 107, the CSM 103 decrypts and post processes the answer, before forwarding the answer to the client 101.

Optionally, a user may implement their own version of the CSM 103, based on specs provided by the SSM 107. Accordingly, users may ensure that their data is encrypted before being imported, and that the server query tool 109 has no access to their plaintext data.

The SSM 107 does not need to perform significant cryptographic tasks. It is not required to change data that is imported to the server query tool 109, or received queries, because these changes would be made by the CSM 103. The SSM 107 might handle some metadata coordination. Alternatively, the server query tool 109 may commonly handle all data imported by the client, regardless of whether it has been encrypted.

The query tool operator 111 is used for implementing certain functionality in the server query tool 109, and may include software modules/functionalities that are called by the server query tool 109. For example, the query tool operator 111 may be used when a query requires that the server query tool 109 change the query itself per each record of the database. Since queries are performed in parallel in many shards, each shard may use its own copy of the query tool operator 109 to modify the queries processed by it.

The encryption of values must be done in a different way per record by the client 101 via the CSM 103. Otherwise, the SSM 107 can identify whether the same value is stored in different records (since these records will all store the same ciphertext). Therefore, in query time, the SSM 107 must change the query per record, so that the modified query agrees with the encryption of that record. This process may require a single application of an encryption function or a hash function per record, and should therefore be substantially efficient. After this modification, the queries will be processed as regular server query tool queries.

When aggregating values of selected records to compute the result of the query (e.g., the sum of the salary field of the selected records), the function used for aggregation might be nonstandard. Such a function may be implemented by the query tool operator.

Query Process

Figure 2A:
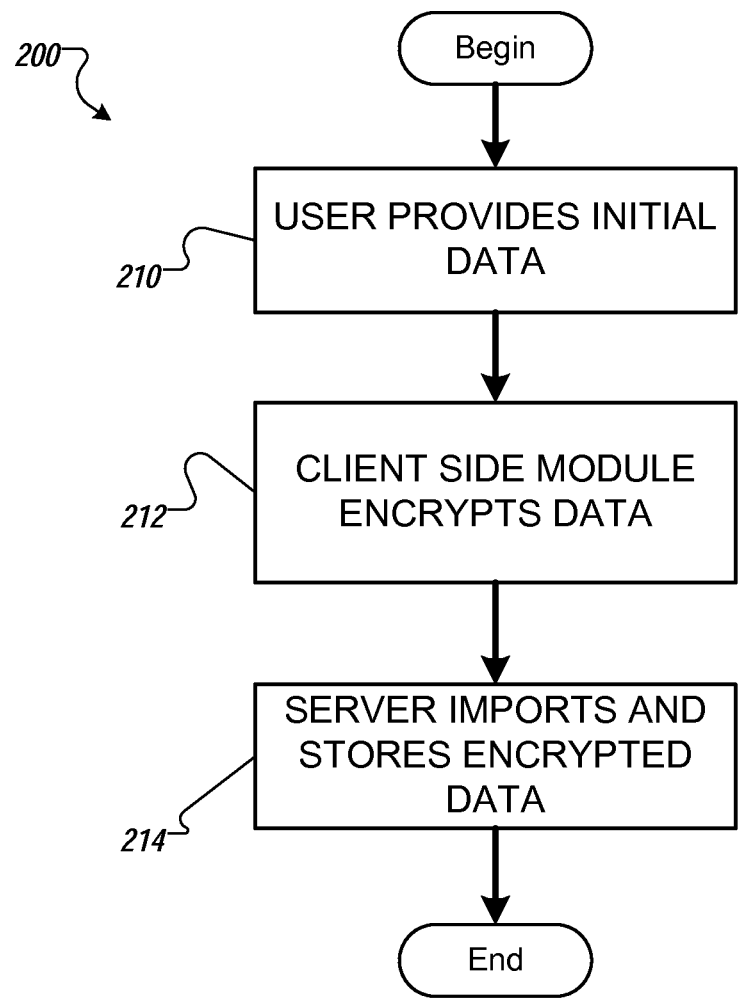
FIGS. 2A-B show an example implementations of operations for importing data and processing a query, respectively.
Figure 2B:
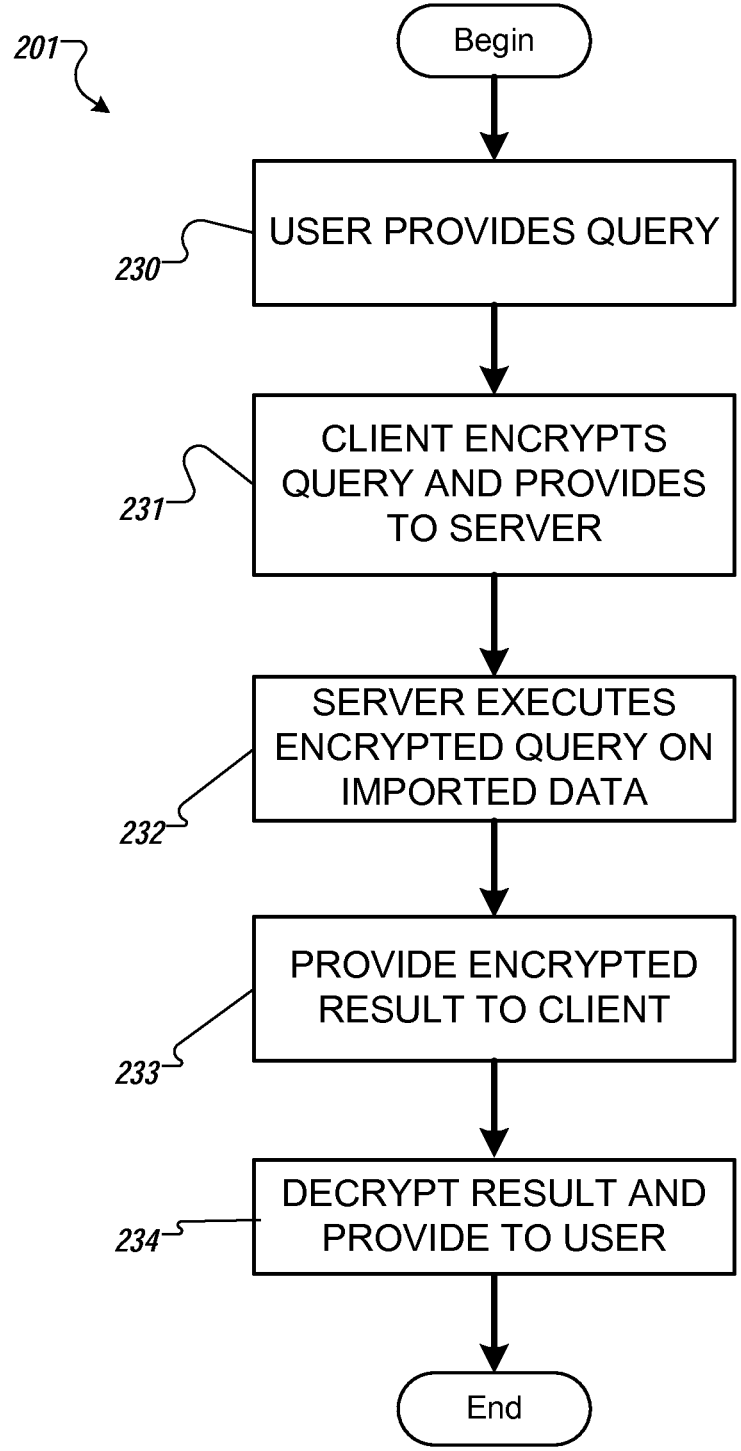

FIGS. 2A-B illustrate example processes for data import and query processing. Aspects of the example implementations relate to a method and system for augmenting a distributed (e.g., client-server) database service to include mixed regular data and secure data in data transport (e.g., from the client to the server) and data query processing by the server.

Import Process

As shown in FIG. 2A, in a process 200 associated with the data import, at the client 101, an initial import process is performed to secure the data. The data import process to the server query tool 109 is performed, before any queries are processed.

At 210, the user provides initial data at the client. The initial data may, for example, be in a regular, unencrypted form that is fully readable. The client 103 imports its data to the CSM 105, together with the following two types of instructions:

1. A list of fields, and of substrings of these fields, that can be used for SELECT operations (e.g., "SELECTable substrings").

2. A list of fields whose values can be used for aggregate answers (e.g., enabling queries to request as answer the sum of a value of a field over the selected records).

The SELECTable substrings are specified as follows:

1. In a simple form, the client may define the SELECTable substrings of a specific field as a list of tuples (i,j) where i<j<the length of field. The SELECTable substrings will be those which start in character position i and end in position j of the field, where (i,j) is in the list of tuples provided by the client.

2. A more complex criteria might depend on the contents of the string. For example, assume that the string is a url. The SELECTable substrings can be defined as all substrings which begin after the domain name and are bordered by two "/" characters.

Note that in this case the specification of the (i,j) pairs defining the SELECTable substrings is not universal for the occurrences of the field in all records, but rather depends on the contents of the field in each record. Namely, each record might have a different set of (i,j) pairs defining the SELECTable substrings of the occurrence of the field in that record.)

3. An even more complex criteria might depend on the values of other fields of the record. For example, a client might define that the SELECTable substrings of the "name" field of a record will be defined in a way which depends on the value of the "salary" field of the record.

If the input criteria given by the client is not a simple list of (i,j) tuples, then the CSM 103 processes each record based on the criteria, computes the (i,j) tuples which agree with the criteria and sets them as the SELECTable substrings of the field. Note again that the occurrences of the same field in different records might have different SELECTable substrings.

The structure of the entire system is such that the server will not learn the locations of the SELECTable substrings, or their exact number. SELECT operations will be performed by providing a string X and a field name F. The system will select all records that contain X as one of the SELECTable substrings of the occurrence of the field F in them. This definition enables a large set of SELECT operations.

For example, the following type of queries may be supported:

Selecting based on the value of the entire field (requires storing just a single (i,j) tuple).

Selecting a record if the prefix of a field matches a certain value (requires n tuples, for a string of length n; less tuples if some bound on the length of the prefix is known in advance).

Selecting a record if a substring X appears in a location that is defined by a regular expression which is known to the client at the time the data was inserted. (That is, the location of the SELECTable substrings must be defined by a regular expression. The CSM can therefore evaluate the expression and store the data relevant to the SELECTable substrings.)

At 212, the data may be secured at the CSM 103 via cryptographic operation; the user may specify the data to be secured, and the data that is not secured. Techniques associated with the encryption of the data are discussed in greater detail below. Before importing the data to the SSM 107, the CSM 103 will first encrypt it using a suitable encryption schemes, and generate tables which support the server executing SELECT operations on the SELECTable substrings.

Encryption: Two types of fields include: (1) fields whose values can be aggregated as part of an answer to a SELECT query, and (2) all other fields. Fields of the first type will only be of numerical values. For example, this could be a salary field, if the client expects that it will issue queries whose answer is, say, the average salary of employees whose ages match a certain criteria.

Fields of the first type will be encrypted by the CSM 103 using an encryption scheme which supports aggregation, namely, which enables to compute a function of the plaintext by computing a function on the ciphertexts. For example, an additively homomorphic encryption scheme may include Paillier's encryption scheme, or El Gamal encryption in the exponent. Using this type of functions supports the SUM and COUNT functions. Fields of the second type will be encrypted by the CSM 103 using arbitrary encryption schemes (which is secure but does not have to support aggregation of plaintext values).

For each field that can be used in a SELECT query, the CSM 103 constructs a table which enables to select the corresponding record by matching any of the SELECTable substrings. This table is generated in encrypted form which will not disclose the values and locations of the SELECTable substrings to the server or the SSM 107. The table will be stored as an additional field of the record. Namely, the CSM 103 will add to each record additional fields which contain encodings of the SELECTable substrings of fields which are searchable by SELECT queries.

At 214, the secured data is then transported from the client to the server, e.g., imported to the server, where the data is stored in encrypted form. Optionally, additional data may be transported from the client to the server, or data previous imported to the server may be deleted. Some regular data may also be provided from the client to the server.

The modified database generated by the CSM 103 will be transferred to the SSM 107. All fields of this database will be encrypted by the CSM 103 and the plaintext will be unreadable by the SSM 107 (e.g., the server). When the SSM 107 receives the database, it stores it as any server query tool 109.

Query Process

As shown in FIG. 2B, in a process 201 associated with the query, at 230, the client may perform a query on the database that includes the foregoing imported mixed data at the server. More specifically, to perform a query, the client 103 submits the query to the CSM 105.

At 231, the initial processing of the query as provided by the user is performed at the client side to generate a secure query (e.g., encryption). The processing of the query involves one or more cryptographic operations on the data, the details of which are discussed further below with regard to FIGS. 7-11A, for example.

More specifically, the CSM 105 rewrites the client query to a modified query on the encrypted database The SELECT string is rewritten in an encrypted version. In addition, the modified query contains instructions on how the server query tool 107 must change this string for each record that is searched.

The CSM 103 rewrites the aggregation function to a form that can be applied to the encrypted data. For example, if the client wishes to sum the values of a field in all selected records, the CSM 103 translates the query to one which tells the SSM 107 to perform a homomorphic addition of the corresponding ciphertexts. This rewrite of the operation does not depend on any secret information. Therefore the aggregation function can be sent in plain form to the SSM 107, and be rewritten by the SSM 107. The CSM 103 then sends the modified query to the SSM 107 via the Internet 105.

At 232, the secure query is provided to the server, where operations (e.g., quick manipulation) are performed on the some of the data sets at the server, including the secured data as well as regular data (e.g., clear data).

At 233, a query result is generated and provided to the client, in the encrypted form. The processing of the encrypted query may include manipulation and matching of the encrypted data. For example, the performing of the query on the encrypted data includes one of multiplication and manipulation of ciphertext. The encrypted data at the server as well as the encrypted query remains encrypted, and the actual values of the data as provided by the client are not determined by the server.

The query that the server receives is a plain server query tool 109 query, with the following exception. When performing a "SELECT . . . CONTAINS . . . " query, instead of searching for the same string in all records, the string is modified per each record. This modification is done by the query tool operator 111, and involves hashing or encrypting the string with a key/parameter corresponding to each record.

A "SELECT . . . CONTAINS . . . " query submitted by the client is different than in normal Server query tool 109 usage is as follows:

The SSM 107 will not look for the search string in arbitrary locations in the relevant string, but rather in the SELECTable substrings.

The query will be transformed to a search for an encrypted version of the string, in a field which is different than the original field. Namely, this field will include the encrypted versions of the SELECTable substrings of the original string.

If the query requests returning the entire selected records, or certain fields of the selected records, then the server returns them in encrypted form to the client side, where the CSM decrypts these results and returns them to the client.

If the query requests returning aggregate values of certain fields of selected records, then the server performs the corresponding aggregation function on these fields and returns the results to the client.

At 234, the client then performs further processing (e.g., interpretation) of the query result (e.g., decryption), to provide the result to the user at the client as clear data information. The desired result is then provided to the user. Throughout the operations, the cryptographic keys remain at the client, and the server performs all operations without accessing the cryptographic keys of the client.

In the foregoing operations, fast aggregation of data (e.g., counting, adding, summing, averaging of data) is performed, where the server performs data aggregation over encrypted rows of data, resulting in an aggregated encrypted value (e.g., ciphertext of aggregation). Further, clients are provided with this result and can decrypt the result, and obtain the actual cleartext aggregated result for the user, which the server cannot determine. The criteria for which record in a row of data is to be processed is based on criteria that is a mix of cleartext data and cryptographically manipulated data.

Example Supported Queries

Various types of select operations may be implemented having privacy properties, and functions that can be applied to selected records. For example, for an average of an encrypted field, assuming that each record contains a zip code, an encrypted customer count per zip code E(CZ), and a nonencrypted count of the population, PZ, in that zip code, the result of the query may be an encryption of the total number of customers in selected zip codes, but may also be an encryption of the mean percentage of customers in each zip code, namely the average of E(CZ))/PZ.

The query tool operator may support different privacy levels for select operations. For example, in a public select query, the client does not hide the select criteria. The client might be interested in hiding the result of the query. For example, the client might request all sales records for customers having an address on $8^{th}$ Ave., but may not be interested in hiding from the server the address fields of records, and that "$8^{th}$ Ave." is the selection criterion of the query. Other fields of the records might be Encrypted, and therefore, the server does not learn the contents of those fields. The result of the query may be that all (encrypted) records with an "8th Ave." address, or some fields of these records (as defined by the client) are sent to the client.

Alternatively, the client might be interested in the total amount of sales to businesses on 8th Ave. The client may want to hide sales numbers, but may does not care about revealing to the server that the query is about records with a certain address. Thus, the sales fields may be encrypted with an additively homomorphic encryption scheme, as explained in greater detail below. The server may find the selected records, add their encrypted sales fields, and send the encrypted result to the client, which can then decrypt it.

According to an example implementation, a level of privacy can be provided by combining the foregoing approach with a use of pseudonyms. For example, if the client replaces each address field with a pseudonym for the street name and optionally, keeps all other records encrypted, the client can perform previous queries by selecting the records with a street field equal to the pseudonym of "8th Ave.". This select operation can be performed as a standard select operation. This approach may reveal some information to the server. For example, by observing the number of records having an address equal to the pseudonym of "8th Ave.", the server may deduce that the records are all associated with an avenue, rather than a small street.

In addition to the foregoing, a private select criteria may be provided, in which the selection criteria is kept secret from the server, yet the identities of the selected records are revealed to the server. The server cannot determine the criterion (e.g., the street name) used for the selection, and might not even learn which fields of the record are being used for the selection process. The server can learn the identities of the records which match the select criterion. For example, the server may be asked to return the selected records to the client, or to perform some aggregation of fields of these records.

According to the example, implementation, the server query tool can support the foregoing queries in a manner that the overhead of answering a query does not change substantially.

In addition, according to a private select process, the selection criterion as well as the identities of the records which match this criterion cannot be determined by the server. For example, but not by way of limitation, the client might query the server for the average salary of employees having a family name of "Smith". The server will not know the selection criterion, and will also not know which, or even how many, records match this criterion, and further, cannot determine any information about salaries.

Queries in which the selection criterion is public can be implemented by the server query tool, including by use of queries where the selection is based on a field which is not encrypted, or in which the plaintext is replaced with a pseudonym. The query tool operator may also support the selection of "all" records, or of all records in which a certain field is nonNULL. Other commands which that may be implemented include, but are not limited to, "SELECT field_name FROM table_name", the SHOW TABLES, DESCRIBE and DESCRIBE WHERE statements.

In addition, the query tool operator can support private selection queries based on the following criterion: a record is selected if the field specified in the query has a certain value as a substring. Further details are explained below. The server does not learn the selection criteria, or the identities of the field whose value is used for the selection process (e.g., that the select operation is done based on a prescribed field, e.g., name field.).

For example, the following selection criteria is considered:
SELECT queries where the WHERE clause uses the CONTAINS function, e.g., WHERE field_name CONTAINS 'sql'

The CONTAINS function can only be applied to string fields (rather than to numerical fields). Thus, the CONTAINS operation only matches with a subset of all possible substrings of the relevant field. This subset of all substrings is defined in advance by the client. For example, the client may define a field containing a url, that matches could be made to any substring of the url which begins and end with a '/'.

The OMIT . . . IF clause can be handled in a similar way to WHERE.

With respect to numerical queries if the value of the field comes from a small range, it may be replaced with a pseudonym, and the selection is performed as explained above. Alternative methods may also be substituted therefor, with departing from the scope of the inventive concept. The pseudonym may be different for every record, to prevent the server from identifying records which have the same value. There are alternative methods for supporting queries of this type. For example, if values comes from the range $[1,n]$, and a field has a value j, replace the field with a field which includes the encodings of $[j, j+1, \ldots, n]$, to enable efficient searches for $<$, $=$, $>$ operations. This example process may require the expansion of fields by a factor of $O(n)$ to support $<$, $>$ queries on a range of size n.

If the value comes from a range which is substantially larger, a solution may be employed that is based on order preserving encryption. This approach may reveal to the server information about the order of ciphertexts.

According to an example implementation, supported functions include, but are not limited to, returning either all selected records, returning arbitrary fields of the selected records, as defined by the client, or returning aggregate functions of fields of the selected records (a privacy preserving implementation for SUM and COUNT can be performed, as well as MAX, MIN, NTH and TOP, if the size of the domain of the relevant values is not large).

For example, with respect to the SUM and COUNT queries, it would be possible to compute the sum of the salary field of all records which match a certain criteria. Since the relevant fields are encrypted, the aggregate function will have to be computed over the ciphertexts. This can be done by encrypting all salary fields using an additively homomorphic encryption scheme, such as Paillier's encryption scheme. Encryption schemes of this type have the property that multiplying two ciphertexts, which encrypt, say, the values A and B, gives a ciphertext which encrypts the value A+B. This operation can be done without knowledge of the private decryption key. The server can therefore multiply the ciphertexts of the salaries of the selected records.

The aggregation operation (e.g., multiplying ciphertexts) will most likely be implemented in the query tool operator 111, which could either be called for each record that is processed, or alternatively be called after all records are selected by the shard and then asked to multiply all of their ciphertexts. It is also possible to implement the aggregation at the SSM 107, and compute it after obtaining all encrypted output fields of the selected records. However, implementation at the query tool operator 111 may have the advantage of utilizing the distributed power of all shards of the server query tool 109, whereas an implementation in the SSM 107 requires this single server to compute the aggregation of all selected fields. This may be plausible only if the number of selected records is relatively small.

For the TOP, NTH, ORDER BY, MAX and MIN queries, one solution is for the case where the domain size is small replaces that field with a field whose length is about 2032 bits per possible value of the original field. This solution is therefore reasonable if the size of the domain of the original field is not large. If the number selected records is small, then the server can send the encrypted relevant fields to the client. The CSM 103 can then decrypt these fields, and compute the relevant query (e.g., MAX, TOP).

Supporting functions for which the server query tool 109 computes approximations, such as COUNT DISTINCT and QUANTILE, depends on the approximation algorithm that is used. The LIMIT clause, which limits the number of answers that are sent to the client, can be implemented on the server side since its implementation does not require knowledge of the actual values of the results.

Example Query

FIGS. 3-5 illustrate an example prototype to make queries over encrypted data stored in the SSM 107. Various types of queries possible are explained above, and example queries are further explained below.

1. Return encrypted fields of (publicly) selected records:
   e.g. "SELECT Year, Model From mydata.cars WHERE Year >1996"
   Here, the fields 'Model' is a field whose data is kept private from the server, for example by encrypting the field data, whereas the 'Year' field is stored in the clear and visible to the SSM 109. When retrieved, the client displays the clear values for both Year and Model data.

2. Privately select records and return fields (encrypted or not):
   e.g. "SELECT Year, Model From mydata.cars WHERE Description CONTAINS 'moon roof'"
   Model field contains encrypted data and Description field data is also hidden from the server, yet it allows for lookup of substrings within it. When retrieved, the client 101 displays the clear values for both Year and Model data. The solution for privately selecting record is described further below.

3. Sum aggregation of field with encrypted integers or floats:
   The row selection criteria may be private or public.
   e.g. "SELECT sum(Price) From mydata.cars WHERE Year >1996" or "SELECT sum(Price) From mydata.cars WHERE Description CONTAINS 'moon roof'".
   Although Price is encrypted at the server, the server can do summation over the encrypted values without knowing them and returns the encrypted sum. This is possible with the use of homomorphic encryption. When retrieved, the client 101 displays the clear value of sum (data).

The SSM 107 allows a json specification of table schema, however, it is extended to be able to specify which fields are encrypted and with what type of encryption. Hence, another key value pair is added, with key name "encrypt" as shown in FIG. 3, which may have a value of:

1. "none" (specifies that the field should not be encrypted)
2. "pseudonym" (specifies that the field is encrypted deterministically, so a reencryption always results in the same ciphertext. Uses AES_CBC encryption with a fixed IV). This is useful for both retrieving the encrypted field value as in "SELECT Year, Make from mydataset.cars WHERE Year >1996". Make data pseudonym encrypted and stored on the servers. When retrieved, the client displays the clear values for both Year and Make data. This is also useful for testing for equality using the encrypted value, for example, "SELECT Year from mydataset.cars WHERE MAKE='Jeep'". Here since Make is deterministically encrypted it can be used to privately select records (e.g., using equality).
   TODO: Add a tweak using field name, so value is different for each field.
3. "probabilistic" (specifies that the field is encrypted probabilistically, so that a reencryption creates a new ciphertext). Uses AES_CBC encryption with a random IV. Thus, this cannot be used in selecting rows.
4. "searchwords" (specifies that the field allows for substring lookup even though the data is hidden from the servers. This is not an encryption mode, in fact hashes are used to perform substring searches). The substring search is limited as follows: only subsequences of words can be searched for where words are characters separated by a 'separator' character. A maximum number of words is also specified.
   An example algorithm is described as follows.
   First split string using separator into words and create all word sequences using all starting point and end points up to some maximum number of words.
   Then create keyed hash of the utf8 encoding of each word sequence using HMAC, then hash the keyed hash with a prepended IV and return space separated base64 encoded hashes; also prepend the IV to the string of hashes.
5. "probabilistic_searchwords" (specifies that the field should be both probabilistically encrypted and also allow for substring lookup).
6. "homomorphic" (specifies that the field should be Paillier encrypted).

An example of an extended schema is shown in FIG. 3 and some accompanying data to be uploaded is shown in FIG. 4.

A load command example is "ebq load master_key_filename="key_file1" mydataset.cars2 cars.csv cars.schema" A master_key_filename pathname needs to be specified or else it will create a master_key and store it in a default file. The key is needed to encrypt and key hash data.

A extended schema file ("cars.schema") needs to be specified so that the load command will know which fields to encrypt and with what type of encryption.

Since the SSM 107 does not understand extended schema, it is converted to a standard schema by replacing field names by an extended field names: pseudonym, probabilistic, and homomorphic encrypted fields are renamed to begin with prefixes PSEUDONYM_, PROBABILISTIC_, and HOMOMORPHIC_ respectively. For "searchwords", a field is added with the prefix "SEARCHWORDS_", and for "probabilistic_searchwords" both a field is added with prefix "SEARCHWORDS_" and the original field is renamed with a prefix "PROBABILISTIC_". In all cases, the encrypt key value pair entry is removed. An example of the converted schema is in FIG. 5. When a field is both renamed and added, as in "probabilistic_searchwords", it allows for distinguishing between the two fields.

The data is encrypted based on the algorithm specified and the hashes is added for encrypted search. The resulting ciphertext and hashes are byte values whereas the SSM 107 does not yet have a established mechanism for uploading and retrieving byte strings, hence, for the time being all byte strings are base64 encoded before uploading.

An example implementation of query1 may include:
ebq query master_key_filename="key_file1" schema=cars2.schema "SELECT Make FROM mydataset.cars"

The master_key_filename needs to be specified in order to know what key to use to decrypt returned data. Also the extended schema file needs to be supplied in order to know which fields are encrypted and with what type of encryption. The above query SELECT part is rewritten before sending to the server as follows, and the content preceding is dropped SELECT since it is the same as below:

"SELECT PSEUDONYM_Make FROM mydataset.cars"

The Make is renamed which allows the client to detect returned data as something that requires decryption. A regexp may be used to detect and decrypt data, but for robustness full parsing may also be used. The above query results in display of the clear values of Make even though they are stored encrypted on the server:

```
---------------
| Make |
---------------
| Ford |
| Chevy|
| Chevy|
| Jeep |
---------------
```

Example query2:

SELECT Year, Make, Model FROM mydataset.cars2 wHere Make='Jeep'

Converted:

SELECT Year, PSEUDONYM_Make, PROBABILIS-TIC_Model FROM mydataset.cars2 WHERE PSEUDONYM_Make='e68rvB3zFEkA76/8dn4ZbQ=='

Example query3:

SELECT Year, Make, Model, Price FROM mydataset.cars2 wHere Description CONTAINS '
   moon roof,'

Example Server Query Process

Figure 6:
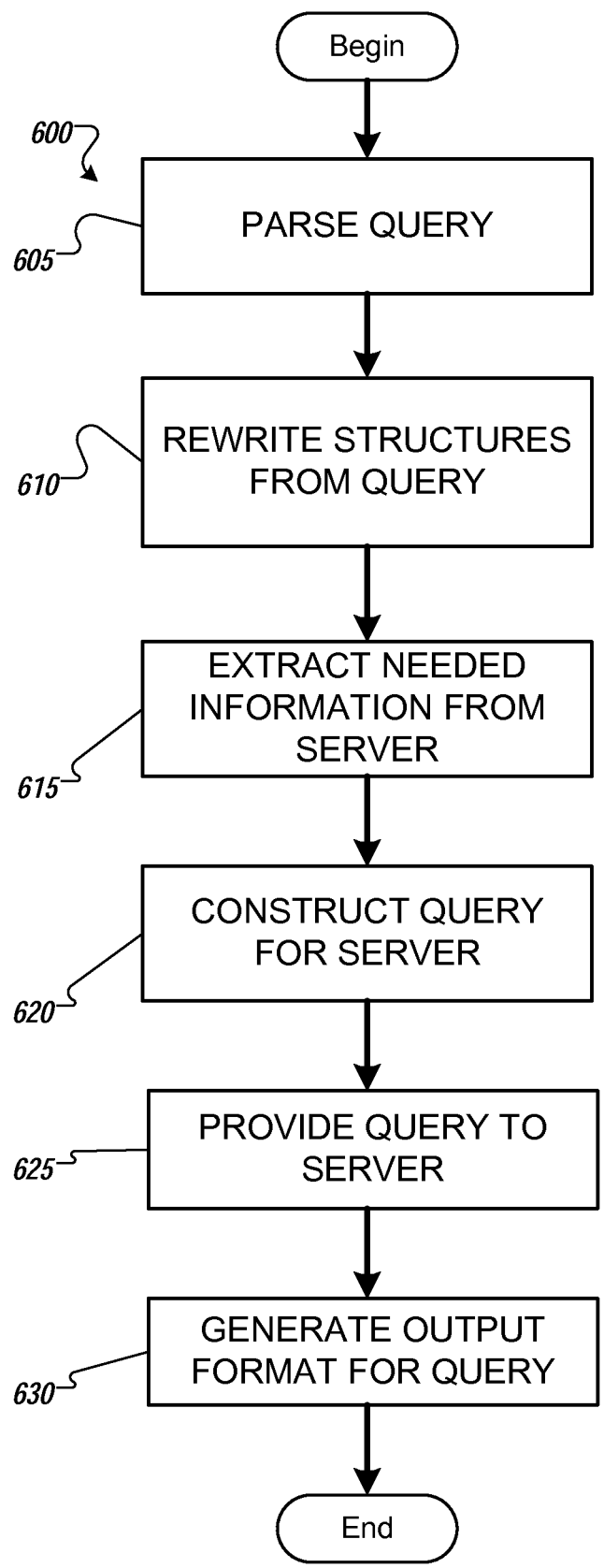
FIG. 6 shows an example implementation of operations performed by a server.

FIG. 6 illustrates an example server query process. Prior to the server query, a load operation may be performed as follows. First, validating and rewriting the schema ensures that all names and types are properly included and assigned. Users can voluntarily defined modes and encryption for each field. For all fields that need to be encrypted, their names are prepended with a prefix depending on which type of encryption is used. The encryption type will be removed. The types of fields might also be changed depending on what type the ciphertext needs to be stored in.

Second, validating an rewriting the original schema ensures that the data file fits into the schema's definition. Then, the data file is rewritten by encrypting all fields that the user defined. The names of a field might also be changed (e.g., in the case of json data files) as to match the rewritten schema.

Third, loading of the rewritten data file using a rewritten scheme is performed. The original premise of rewriting both the schema and the data file was to make them become a proper schema and data file that can be loaded using the SSM 107 load command. However, the actual loading is done by the SSM 107.

At 605, parsing of the query is performed by small hacks that make ease later aspects of in the process. A main premise of this operation is to read and parse the sql command such that the result expression can be manipulated and evaluated. Operation 605 is described in further detail as follows:

SELECT clause

The select clause consists of multiple expressions (comma separated) with possible aliasing for each expression. These complex math or string expressions cannot be sent directly to the SSM 107 since they could contain encrypted fields whose ciphertext need to be decrypted to plaintext before any modifications or computations can occur. Each math expression may be converted to postfix. This provides a way to evaluate the expression in the future.

Syntax: SELECT expr1 [AS alias1], expr2 [AS alias2], . . .

To store this, a structure s may be used:

s=[p1, p2, . . . ] where pi is the postfix equivalent (stored in a stack) to expri This structure is referred to as postfix_stacks or stacks throughout the code. The alias will be stored in a dictionary d.

d={ai: li} where ai is the alias string and pli is the expression that is equivalent to ai FROM, GROUP BY, ORDER BY clause These three clauses have very similar structure and are stored in the same way.

Syntax: KEYWORD field1|alias1|table1, field2|alias2|table2, . . .

To store this a structure c is used:

c=[KEYWORD, [field1|alias1|table1, field2|alias2|table2, . . . ]]

LIMIT clause

This clause is identical to the three above clauses except it only takes one number. Thus, it is stored in the same structure:

Syntax: LIMIT num_rows

Use same structure, c.

c=["LIMIT", [num_rows]]

WHERE, HAVING clause

These are somewhat different in that they include expressions that need to be parsed. Therefore, the expressions are parsed into RPN but the same structure c is used.

Syntax: KEYWORD condition c=[KEYWORD, co'] where co' is the RPN equivalent to condition After parsing is finished, three structures are returned. The first two structures returned are postfix_stacks (list of postfix expressions for each comma separated expression) and alias_dictionary (maps aliases to index of expressions in postfix_stacks). Finally, the last structure returned is a commands_list, which is a list of all structure c's which are built from all the clauses (except SELECT and FLATTEN).

Mathematical Expressions

Here, conversion of expressions to RPN is considered. This is very trivial for binary and unary operations. The harder part is incorporating builtin and aggregation functions to the new RPN. The actual hard part of this is that labels can have the same name as these functions. An example is that count can be a field or an aggregation function. To handle this, built-in functions are prepended with 'FUNCTION_' and aggregation functions with 'AGGREGATION_'.

Aggregation functions may be overloaded (e.g., the same function can have different number of arguments). To address this situation, their arguments are taken to concat together. Now, all aggregation functions only have one argument.

At 610, rewriting of structures from the parser is performed. First, the structures all aliases are replaced with their full representative RPN expressions. This allows for creation of aliasing later on for benefit. Next, using the given schema, all encrypted field names are prepended with the correct respective prefix. Finally, the aggregation functions are rewritten. Currently, they are in the form of 'AGGREGATION_i_function'. Here, i represents the number of arguments of this function and function represents its name. Each argument precedes the this label in the stack. Here is also where checks (e.g., complicated) can be performed to ensure that aggregations can occur in the given expression. All aggregation functions may be rewritten as outline above where function is the name of the aggregation function (i.e. GROUP_COUNT becomes AGGREGATION_i_GROUP_CONCAT). However, exceptions may exist with COUNT and SUM as follows:

COUNT

Syntax: COUNT([DISTINCT] field [, n])

If a distinct count is being performed, the function is rewritten to AGGREGATION_i_DISTINCTCOUNT. Otherwise, the function is rewritten to AGGREGATION_i_COUNT.

In the case of nondistinct, field can be any field or alias regardless of encryption type. However, the distinct case is more complicated. Only in PSEUDONYM encryption, is it guaranteed that p=p'< > c=c'. Therefore, only on PSEUDONYM encryption (or none) can distinct count be done. Otherwise, an error occurs.

GROUP_CONCAT

Syntax: GROUP_CONCAT('str')

GROUP_CONCAT does not require any extra error checks. Any field, alias or string is accepted and can be sent to the server. The only hazard is that the field/alias must be of string type, otherwise the result is a fail.

TOP

Syntax: TOP(field, [max_records], [multiplier])

TOP has the same constraint as distinct count. The field is required to be PSEUDONYM encryption or not encrypted at all.

SUM

Syntax: SUM(field)

This requires a lot of manipulation and changes to the structure. The first restriction that is required is that any expression inside field is required to either be encrypted homomorphically (either integer or float) or not be encrypted either. If any other encryption is found, an error will result.

For SUM, the expression is separated into affines (mx+ny+ . . . +z) form. This requires that field be linear on homomorphically encrypted fields. However, due to the complexity of the problem, different requirements may be employed. For example, it may be required that a homomorphically encrypted field is never multiplied or divided with any other field (regardless of it being encrypted or unencrypted). If this occurs, the program will error and terminate. Also, functions are not accepted that that involve homomorphically encrypted fields (i.e. SUM(abs(encrypted_field))). This case will also result in an error.

Once the expression is converted to a sum of affines (where the variables are linear on homomorphically encrypted fields), it is possible to convert this into an expression that can be queried by the SSM 107. Assume that there exists an PAILLIER_SUM function which can do Paillier.

Assume that the simplified expression is: f1x1+f2x2+ . . . +fixi+c.

This can be converted to f1*SUM(x1)+f2*SUM(x2)+ . . . +fi*SUM(xi)+SUM(c). If any of x1 . . . xi are homomorphically encrypted, use PAILLIER_SUM instead. This allows us to do SUM over linear homomorphically encrypted variable expressions.

AVG

Syntax: AVG(field)

AVG(field) is rewritten to SUM(field)/SUM(1). SUM(1) is equivalent to the number of rows considered in the query. Therefore, it is equivalent to AVG(field). SUM(field) is then rewritten based on the above conditions for SUM.

These functions do not have special checks that occur. The rewriting is as expected where i represents the number of arguments and function represents the name of aggregation function.

At 615, all fields and aggregations of fields are extracted that need to be sent to the SSM 107. Since all the rewriting was done in the previous operation, fields can be easily found for query. This is separated into two lists, one list consists of aggregation queries and the second list consists of all fields that need to be queried.

At 620, the query that needs to be sent to the SSM is constructed. For the FROM, GROUP BY, ORDER BY and LIMIT clauses, list of arguments is combined, with comma separation. The WHERE and HAVING clause require more attention. Both these clauses have expressions that are in RPN. So, these need to be converted back to infix. During this infix transformation, other transformations also need to occur, including equality and contains. For equality, if either field is encrypted with any type other PSEUDONYM, this error cannot be handled. In the case that a field is encrypted by PSEUDONYM, the other operand must be a literal or a PSEUDONYM field. If the field is a literal, then the literal must also be encrypted to ciphertext before being sent.

For "contains", consider the expression A contains B. A must either unencrypted or be of SEARCHWORDS encryption. B must be a literal if the A is SEARCHWORD encrypted. B must be converted to ciphertext.

There is another small modification that needs to occur. The SSM 107 converts all periods to underscores in the returned table. This is a problem with nested fields. To resolve this, all periods are replaced with a long nonsense string (_ebq_period_replacement_). This way, it can later be replaced and lost periods can be tracked. The replaced strings are then sent as alias.

At operation 625, the constructed query is provided to the SSM 107. The values are retrieved from the server, and all the fields are then decrypted back to their plaintexts at the CSM 103.

At 630, to generate a format for the table, since all the fields have been provided in plaintext, it is possible to replace the fields in the original RPN expressions with their actual plaintext values. Once this occurs, it is possible to evaluate and output the table.

Encryption at CSM 103

Homomorphic cryptography, such as Paillier homomorphic, includes properties that may be used, for example, by a service provider to clients while protecting the clients' data privacy and/or confidentiality. For example, a client may encrypt data and store the encrypted data (with or without unencrypted data) with a service provider and/or use services of the provider to manipulate the encrypted data without revealing the actual data to the service provider.

Taking advantage of the additive property, for example, a client may encrypt values V1, V2, . . . , Vm (plaintexts) to produce C1, C2, . . . , Cm (ciphertext). The client then uploads C1, C2, . . . , Cm (and possibly other plaintexts and/or ciphertexts) to a service provider (e.g., cloud storage). The service provider may provide services using C1, C2, . . . , Cm without knowing V1, V2, . . . , Vm (i.e., without needing to decrypt C1, C2, . . . , Cm to V1, V2, . . . , Vm).

In digital computing, values are represented in binary bit strings (e.g., values encoded in strings of registers of 8 bits, 16 bits, 32 bits, 64 bits, other bit length, etc.). The additive property of homomorphic cryptography, such as Paillier homomorphic, are useful only on positive values (e.g., encoded as unsigned binary values in bit strings) due to the homomorphic addition of ciphertexts (i.e., product of C1, C2, . . . , Cm modulo N), which only results in an unsigned binary addition (i.e., the sum of V1, V2, . . . , Vm).

The subject matter herein describes example techniques that allow the application of homomorphic cryptography on numerical values that are positive, negative, or a combination thereof, and the values may be integers and/or floating numbers.

Figure 7:
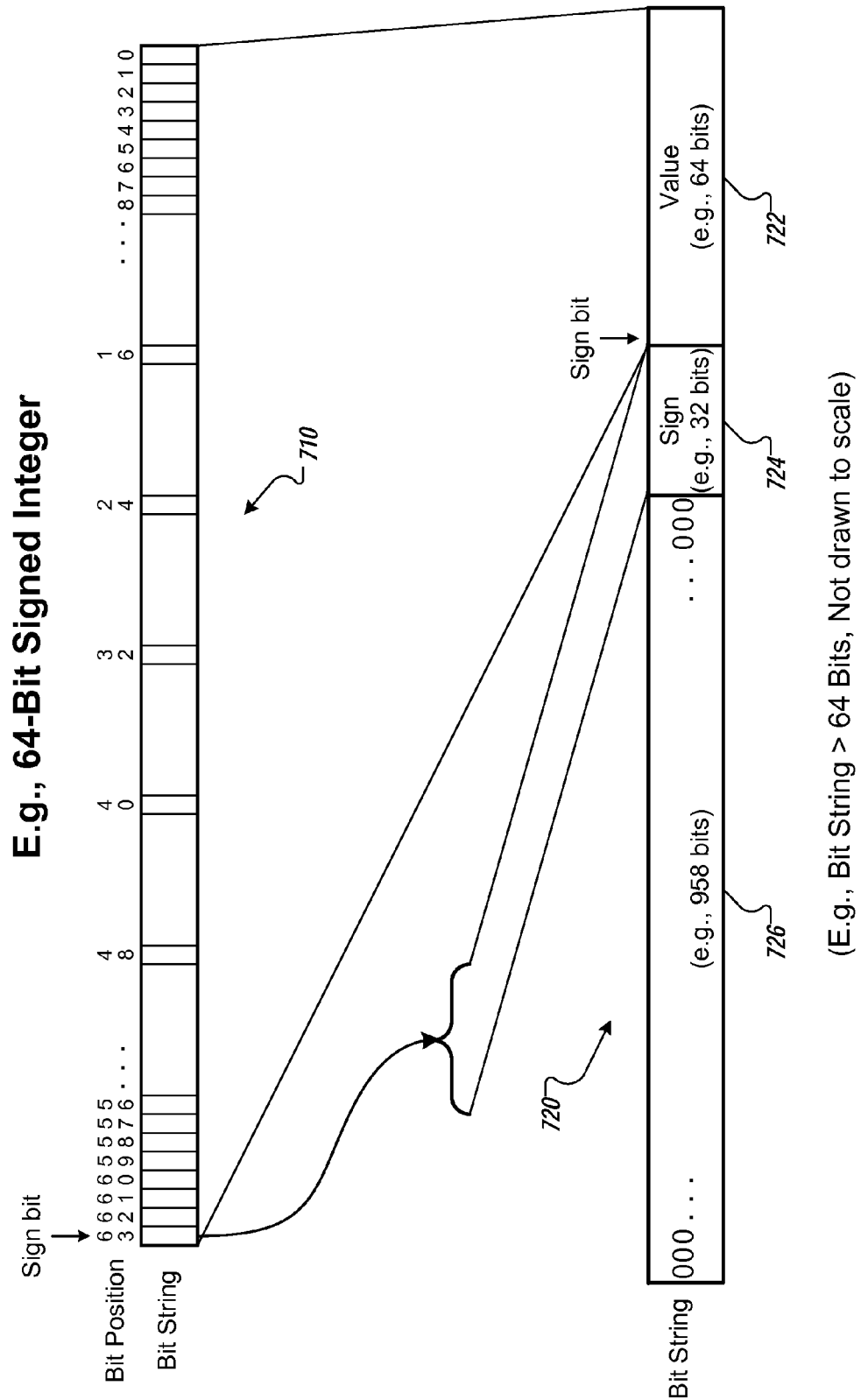
FIG. 7 shows an example implementation with an example representation of numerical values in digital computing.

FIG. 7 shows an implementation with an example representation of numerical values in digital computing. FIG. 7 shows an example implementation of signed integers encoded in bit strings of any length, such as 8 bits, 16 bits, 32 bits, 48 bits, 64 bits, 96 bit, 128 bits, and/or other lengths that may be multiple of eight or not multiple of eight. The example in FIG. 7 is illustrated with 64-bit signed integers. Bit string 710 includes 64 bits, bits 0 to 63. Bit 63, the $64^{th}$ bit, is a sign bit. Bit string 710 holds a positive number when the sign bit is zero ("0"), and a negative number when the sign bit is one ("1"). A Negative number is encoded using two's complement, which is well-known in digital computing.

To enable the summation of two or more plaintexts (e.g., in the form a product of the respective ciphertexts) bit string 710 is expanded into a longer bit string 720. The length of bit string 720 also increases the protection of the value encoded in bit string 720 in the encrypted form (e.g., protecting the corresponding ciphertext from deciphering by hacking without the private key).

The length of bit string 720 may be any length that is longer than the length of bit string 710 (i.e., bit string 720 is at least one bit longer than bit string 710). The length may be chosen according to implementations and/or requirements. The total length of bit string 720 may be determined based on a desired cryptography security, system performance, and/or other factors. For example, 128-bit cryptography is easier to hack than cryptography with a longer bit length (e.g., 256 bits, 512 bits, 1024 bits, 2048 bits, etc.). The longer the bit length, the harder it is to hack and/or the more computing power it takes to hack. However, the longer the bit length, the higher the demand or drain on system performance.

For illustration purposes, bit string 720 may be chosen to be 1024 bits in length. This length provides a balance of cryptography security and system performance with the current state of computing technologies. The length may be increased along with the advancement of computing technologies.

Bit string 720 includes regions 722-726. Region 722 holds bit string 710, which may be any number of bits (e.g., 64 bit as shown). To handle both positive and negative numbers using addition operations on both types, a negative number is encoded using two's complement in region 722. Two's complement allows using the same addition operations to add positive and/or negative numbers. Region 724 may be implemented to allow summation of a number of values. For example, to allow up to $2^X$ number of plaintexts being added, region 724 may be X number of bits in. For example, to allow up to $2^{32}$ number of plaintexts being added, bit string 720 would have a 32-bit region 724. In some implementations, the sign bit of bit string 710 may be replicated in region 724 (e.g., X number of times).

Region 726 would equal to the chosen total length minus the lengths of regions 722 and 724. In this example, region 726 is of 958 bits in length. In some implementations, the bit values in region 726 are not significant and region 726 may contain any bit values, such as all zeros, all ones, or any combination thereof. All zeros are shown for example. In some implementations, there may be other usages and/or regions in place of or in addition to region 726, the length of which is determined based on the total length and lengths of other regions.

An example implementation of homomorphic encryption of 1024-bit plaintexts would product 2048-bit ciphertexts. Paillier cryptography or cryptosystem is described as an example homomorphic cryptosystem, which is not limited to Paillier cryptography (or Paillier technique). Paillier cryptosystem is a well-known probabilistic asymmetric algorithm for public key cryptography. The details of Paillier cryptography, which are readily available and can be located on the Internet, are omitted to avoid obscuring the subject matter.

For public key cryptography, a public key is used to encrypt a plaintext into a ciphertext, and a corresponding private key is required to decrypt the ciphertext. The public key is (n, g), where n=pq and, as an example, p and q may be chosen to be 512-bit prime numbers; g can be any random integer (e.g., g=n+1 for simplicity). The private key used to decrypt a ciphertext into the corresponding plaintext is ($\lambda$, $\mu$), where $\lambda$=lease common multiple (p−1, q−1); $\mu$=(L($g^\lambda$ mod $n^2$))$^{-1}$ mod n, where L($\mu$)=($\mu$−1)/n.

An example of encrypting a positive integer is illustrated using an integer 15. The value 15 is stored in bit string 710 as all zeros in every bit except bits 0-3, which store "1111". The value in bit string 710 may be referred to as plaintext. The plaintext is then converted to bit string 720, which includes regions 722-726. Region 722 and 724, with a combined length of 96, in this example, may be referred to as an extended plaintext. For a positive integer, the sign bit is zero. Region 724 holds, in this example, 32 copies of the sign bit (e.g., 32 zeros). Region 722 holds the same value as bit string 710. In combination, the binary representation of the 96-bit extended plaintext is all zeros bits except the four least significant bits (i.e., the four leftmost bits), which is "1111".

After a 64-bit positive plaintext is converted to a 96-bit extended plaintext, bit string 720, the entire length, including region 726 is encrypted using Paillier's encryption technique to produce a corresponding ciphertext. The ciphertext is twice as long (e.g., 2048 bits) as the length of bit string 720.

Encrypting a negative integer is performed the same way as encrypting a positive integer with the additional operation of converting the plaintext to a two's complement binary string before the plaintext is converted to an extended plaintext as described above, or after the plaintext is converted to an extended plaintext, convert the extended plaintext to a two's complement binary string before encrypting. An example formula for converting a number (e.g., −15) to a two's complement representation is:

(Abs(−15) XOR all-ones-bit-string-of-same-length)+1

For example, Abs(−15)="000 . . . 0001111" (a string of 96 bits or 64 bits with all zeros except bits 3-0 being "1111".

"000 . . . 0001111" XOR "111 . . . 1111111"="111 . . . 1110000".

"111 . . . 1110000"+1="111 . . . 1110001".

Using two's complement to represent the numbers (e.g., V1, V2, . . . , Vm) allows the numbers to be added in their encrypted form (e.g., C1, C2, . . . , Cm, by multiplying them together then modulo n, referred to herein as Paillier summation) using just addition operations. The numbers can be any combination of positive and negative numbers. Since positive numbers do not change in two's complement representation, only the negative numbers need to be converted to two's complement represented numbers. After all the additions in their encrypted form (e.g., C1*C2* . . . *Cm Mod n=Cproduct) the resulting ciphertext Cproduct would be decrypted into Vsum (i.e., Vsum=V1+V2+ . . . +Vm). Then Vsum can be converted back from two's complement representation to signed-bit representation of an extended plaintext, which can be converted to a 64-bit representation of a positive or negative number with the most significant bit, the $64^{th}$ bit, being a sign bit.

Region 724 is implemented to support Paillier summation of a number of values, and the length depends on implementation. For example, to support the summation of 2^32 (i.e., 2 to the power of 32) values, the appropriate length is at least 32 bits. This length allows up to 2^32 additions (e.g., Paillier summation) to be performed (i.e., Cproduct is the product of up to 2^32 ciphertexts, mod n). Region 724 allows the detection of overflow by, for example, treating the extended plaintexts underlying the corresponding ciphertexts as a 96-bit extended two's complement numbers, including the 32 bits in region 724, which would be all ones or all zeros based on the sign bit of the 64-bit plaintext. With the length of 32 bits in region 724, up to 2^32 numbers (positive or negative) can be added before a carryover beyond the 96th bit, which essentially means that there will be no carry overs as long as less than 2^32 Paillier additions occur.

After decryption, overflow of the extended plaintext is detected if the sign bits (i.e., bits 63 to 95 in region 724) are neither all zeros nor all ones. In case the extended plaintext contains a positive number (i.e., sign bits are all zeros), the 96-bit positive number may be converted to a 64-bit number using the lower 63 bits with a 64th bit being zero (e.g., returning or copying the lower 63 bits in region 722 with the 64[th]=zero). In case the number is negative (i.e., sign bits are all ones), the 96 bit negative number may be converted to a negative 64-bit number (e.g., returning or copying the lower 63 bits in region 722). The converted 64-bit number may be stored in a bit string such as bit string 710.

An example decryption algorithm is described below. For simplicity, the least significant bit (LSB) is referred to as bit number one in the example. First, a ciphertext, which may be any one of C1, C2, . . . , Cm, or Cproduct, is decrypted using the Paillier technique (e.g., using the private key generated using Paillier cryptography). The decryption operation yields an extended plaintext (e.g., a 1024-bit value with 96 LSB bits being used). Bits 1 to 63 may be referred to as valuebits1to63 (e.g., a copy of bits 1-63 of the extended plaintext), and bits 64 to 96, signbits64to96 (e.g., a copy of bits 64-96 of the extended plaintext). If valuebits1to63 is neither all zeros nor all ones, then an overflow is indicated and detected (e.g., may raise an overflow error or exception in implementation). If signbits64to96 is all zeros, valuebits1to63 is a positive integer. If signbits64to96 is all ones, convert the 96 LSB bits of the extended plaintext to a two's complement representation (e.g., positive_96-bit_value=(96 LSB bits XOR 96-bits-of-all-ones)+1). Take the 64 LSB of positive_96-bit_value multiply by negative one and return the result as a negative value (which may be stored in bit string 710 as a signed integer, with the sign bit being "1").

Figure 8:
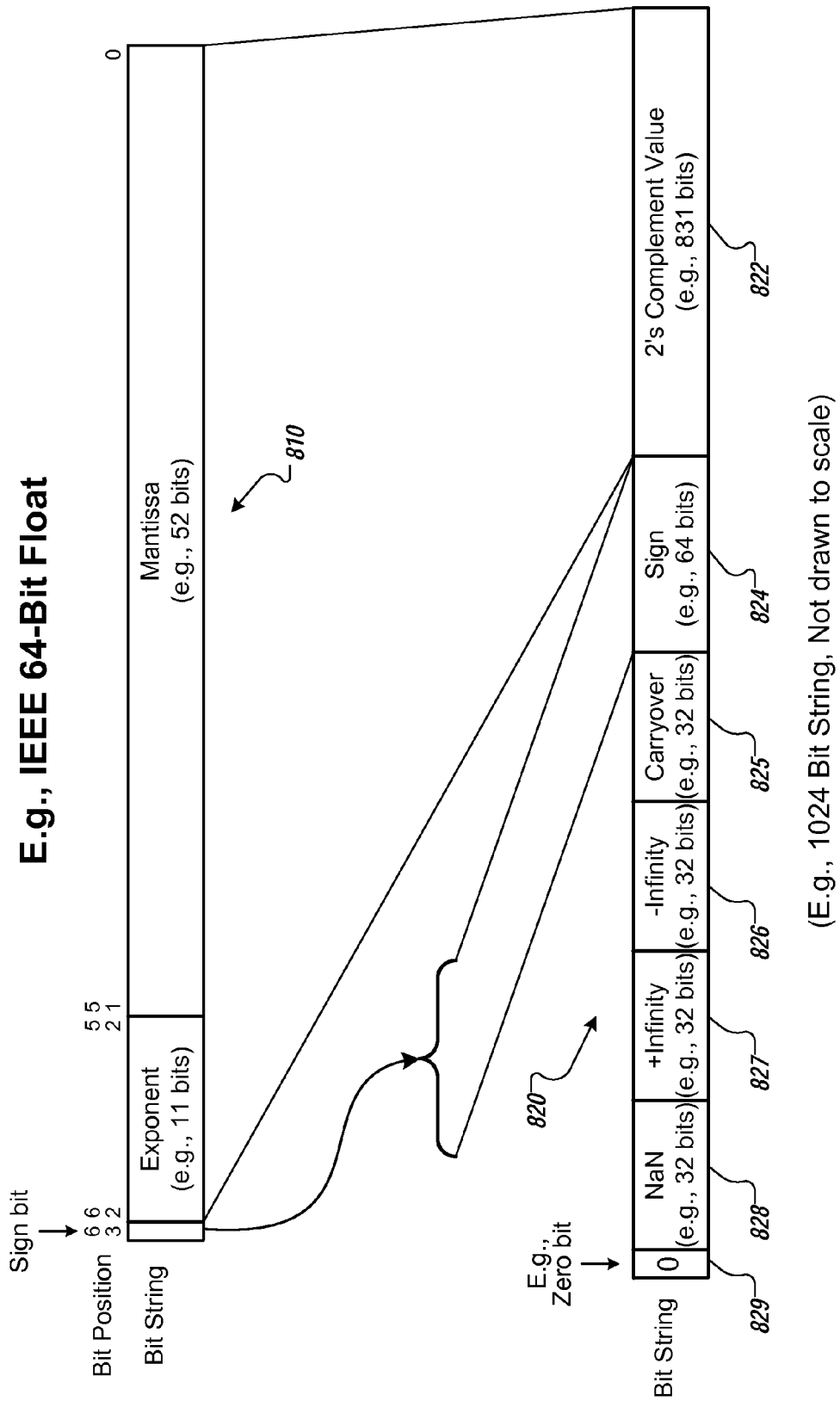
FIG. 8 shows another example implementation with another example representation of numerical values in digital computing.

FIG. 8 shows another implementation with another example representation of numerical values in digital computing. FIG. 8 shows an example implementation of signed floating numbers or floats encoded in bit strings of any length, such as 8 bits, 16 bits, 32 bits, 48 bits, 64 bits, 96 bit, 128 bits, and/or other lengths that may be multiple of eight or not multiple of eight. The example in FIG. 8 is illustrated with 64-bit signed floating-point format according to the Institute of Electrical and Electronics Engineers (IEEE) 754 standard, the details of which are omitted to avoid obscuring the subject matter. Bit string 810 includes 64 bits, bits 0 to 63. Bit 63, the 64th bit, is a sign bit as described above. Bits 52-63 holds the 11-bit exponent. Bits 0-51 holds the 52-bit mantissa.

To enable Paillier summation of two or more floating numbers as plaintexts (e.g., in the form a product of the respective ciphertexts) bit string 810 is expanded into a longer bit string 820. The length of bit string 820 may be further increased to increase the protection of the value encoded in bit string 820 in the encrypted form (e.g., protecting the corresponding ciphertext from deciphering by hacking without the private key).

The length of bit string 820 may be any length that is longer than the length of bit string 810 (i.e., bit string 820 is at least one bit longer than bit string 810). The length may be chosen according to implementations and/or requirements. The total length of bit string 820 may be determined based on a desired cryptography security, system performance, and/or other factors, as described in FIG. 7 the case of integer numbers.

For illustration purposes, bit string 820 may be chosen to be at least 1024 bits in length (e.g., 1024 bits). This length provides a balance of cryptography security and system performance with the current state of computing technologies. The length may be increased along with the advancement of computing technologies. To enable Paillier summation to work with both positive and negative float values of different magnitudes, the mantissa and exponent are represented using two's complement values.

For a 64-bit float value, the maximum exponent value, in the extended form, is 389 bits of a 1024-bit plaintext due to the limitations of the IEEE 754 standard. If larger values are needed to accommodate application needs, a larger plaintext (e.g., 2048 bits) may be implemented. For the example in FIG. 8, bit string 820 is illustrated with the length of 1024 bits, which allows 389 bits maximum for representing the exponent. The subject matter is not limited to this 1024-bit example.

Bit string 820 includes the most significant bit (MSB) being set to 0, for example, to avoid any wraparound if the plaintext value becomes larger than p minus 1 (p is one of two prime numbers used in Paillier encryption). Floating point representation includes NaN (not a number), +inf (positive infinity), and −inf (negative infinity) indications. In the example of bit string 820, each of NaN, +inf, and −inf is implemented using a 32-bit length to accommodate up to 2^32 number of NaN, +inf, and −inf in each Paillier summation.

Region 828 may be implemented as a NaN indicator. If the 64-bit float represents a NaN then a "1" is entered in this region, which provides a positive value in the region for detecting the occurrence of a NaN. Regions 827 and 826 may be implemented as +inf and −inf, respectively. Region 825 may be implemented to indicate carryover from Paillier summation that does not result in a NaN, +inf, or −inf. The example length of 32 bits allows up to 2^32 number of float values being added. Region 824 is a sign bit region that functions similar to region 724, FIG. 7 (e.g., to detect overflow resulting from Paillier summation, described above). Here, an example length of 64 bits is illustrated. When a number is converted from bit string 810 to bit string 820, the sign bit of bit string 810 is replicated in the 64 bits of region 824.

Region 822 is 831 bits wide that holes two's complement representation of the 64-bit float value from bit string 810. The float value of bit string 820 is expanded into 831 bits by taking a 53-bit mantissa (i.e., a 52-bit mantissa prepended with an explicit 1) and shifting it based on the exponent value (i.e., shifting to the right for a negative exponent, and to the left for positive exponent). A region 822 that is 831 bits wide can only store a float number with maximum 389 bit exponents (i.e., (831−53)/2=389). The 831-bit extended float (may be referred to as an extended plaintext) value is represented using two's complement.

Regions 822-829 are for example only. In some implementations, these regions may be arranged differently and/or with different sizes. In some implementations, there may be other usages and/or regions in place of or in addition to some of regions 822-829.

Examples of encrypting float numbers are illustrated using the values −15.0 and 15.0. The value 15.0 is represented by a 52-bit plaintext mantissa "111000 . . . 000" (binary). The plaintext exponent, undecoded, is "10000000010" binary or 1026 in decimal. The decoded exponent is 1026−exponent bias of 1023=3. The sign bit is "0" for the positive 15.0 and is "1" for the −15.0. A float value is described by the formula:

$$-1^{sign} \times 2^{(exponent - exponent\ bias)} \times 1.\text{mantissa}$$

Thus, $-1^1 \times 2^3 \times 1.111000\ldots000 = -1111.000\ldots0000$ since in binary multiplying by $2^3$ is shifting the point to the right three times. For positive 15.0, the result is $-1^0 \times 1111.000\ldots$ 0000=1111.000 . . . 0000 in binary. Converting 1111.000 . . . 0000 to the 831-bit region 822 is performed by ignoring the point after "1111" and fill the rest of the least significant bits with zeros (i.e., "11110000000 . . . 00000" with the four most significant bits being ones and the rest of the bits being zeros). For a positive number in the extended representation, the value in region 822 does not need to be converted to two's complement representation and all 64 bits in region 824 are all zeros.

For a negative number in the extended representation, all 64 bits in region 824 are all ones, and the value in region 822 is converted to two's complement representation. The resulting two's complement value in region 822, shown in hexadecimal, is:

0x7fffffffffffffffffffffffffffffffffffffffffffffffffffffffffff ffffffffffffffffffffffffffe20000000000000000000000000 00000000000000000000000000000000000000000000000000 00000000000000000000000000000000000000L In binary, bit string in region 824 is "111 . . . 111" (383 bits of ones) follows by "11100010" (the binary of the hex characters "e2") follows by "000 . . . 000" (440 bits of zeros).

Encrypting and decrypting extended plaintexts that represent float values are the same as encrypting and decrypting integer values, described above. After a ciphertext is decrypted. The underlying extended plaintext is determined to identify whether the plaintext value is an integer (described in FIG. 7) or float. If it is a float value, the regions 829-825 are examined to identify whether there is a NaN indicator, a+inf indicator, a −inf indicator, or a carryover indicator. Of none, the extended float value (e.g., in regions 822 and 824) may be converted to the format of bit string 810. If one or more indicators in regions 829-825 are detected, appropriate actions, depending on implementation, may be taken (e.g., raising one or more error statuses and/or exceptions).

Figure 9:
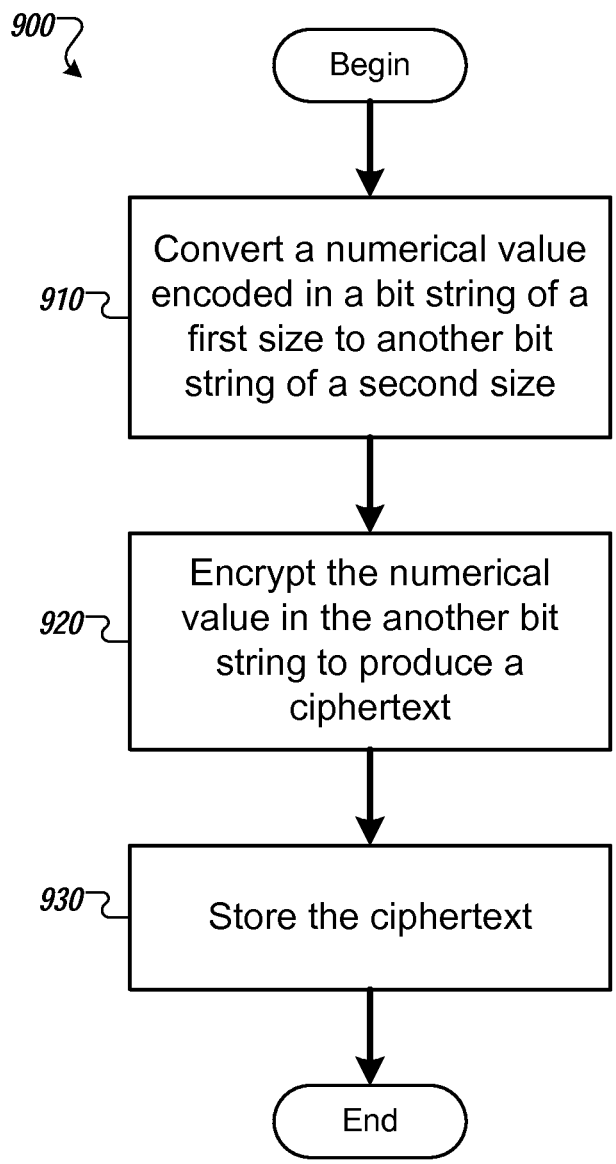
FIG. 9 shows an example of a process implementation associated with representation of numerical values in digital computing.

FIG. 9 shows an example of a process implementation. Process 900 includes, at block 910, converting a numerical value encoded in a bit string of a first size to another bit string of a second size, which is different from the first size. For example, converting a plaintext from bit string 710 to an extended plaintext in bit string 720, FIG. 7, or converting a plaintext from bit string 810 to an extended plaintext in bit string 820, FIG. 8. At block 920, the numerical value in the extended plaintext is encrypted (e.g., using Paillier encryption) to produce a ciphertext. Two or more of these ciphertexts may be multiplied together to produce a sum of the underlying plaintexts, the value of the sum and the underlying plaintexts can be revealed after decrypting. At block 930, the ciphertext may be stored locally and/or transmitted to another server for processing and/or storing.

In some examples, process 900 may be implemented with different, fewer, or more blocks. Process 900 may be implemented as computer executable instructions, which can be stored on a medium, loaded onto one or more processors of one or more computing devices, and executed as a computer-implemented method.

Example Environment

Figure 10:
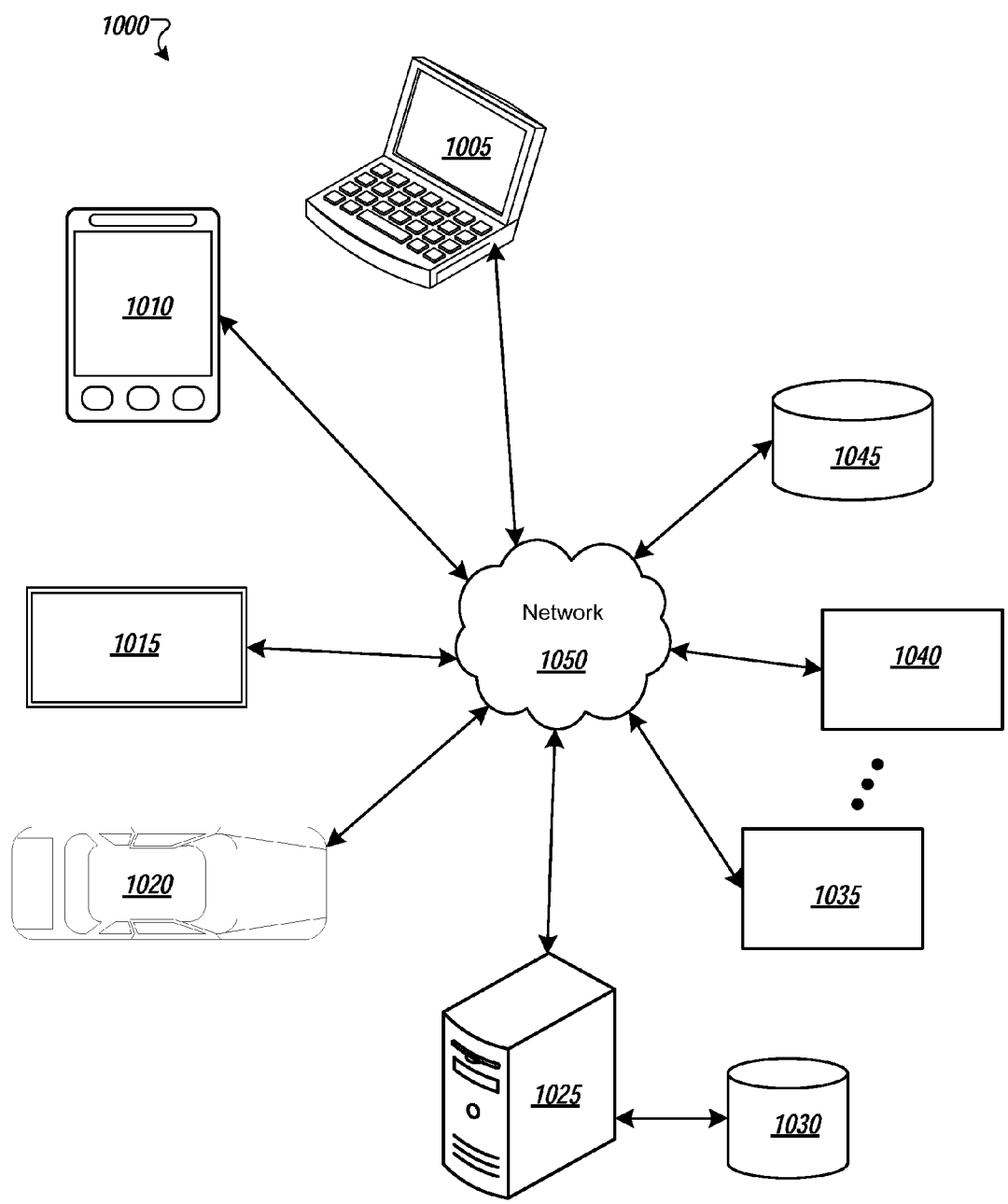
FIG. 10 shows an example environment suitable for some example implementations.

FIG. 10 shows an example environment suitable for some example implementations. Environment 1000 includes devices 1005-1045, and each is communicatively connected to at least one other device via, for example, network 1060 (e.g., by wired and/or wireless connections). Some devices may be communicatively connected to one or more storage devices 1030 and 1045.

An example of one or more devices 1005-1045 may be computing device 1105 described below in FIGS. 11A-B. Devices 1005-1045 may include, but are not limited to, a computer 1005 (e.g., a laptop computing device), a mobile device 1010 (e.g., smartphone or tablet), a television 1015, a device associated with a vehicle 1020, a server computer 1025, computing devices 1035-1040, storage devices 1030 and 1045.

In some implementations, devices 1005-1020 may be considered user devices or client devices (e.g., devices used by users or clients to perform encryption and/or decryption of data). Devices 1025-1045 may be devices associated with service providers (e.g., used by service providers to provide services and/or store data, such as storing plaintexts and/or ciphertexts on behave of one or more devices 1005-1020).

For example, a client may encrypt some data to produce ciphertexts. The client may upload or send the ciphertexts with or without sending along other data for storage and/or processing to one or more devices 1025-1045 of a service provider. The service provider is able to provide services to the client without decrypting and revealing the client's encrypted data in plain view. For example, the client may perform queries of the client's data in the form of ciphertext. The client may perform linear operations (e.g., addition, subtraction, averaging, summation, etc.) on the client's data in the form of ciphertext. The results, which may include results in ciphertext are provided to the client, which can be decrypted on the client's side in the privacy of the client's choosing.

Example Computing Environment

FIG. 11 shows an example computing environment with an example computing device suitable for use in some example implementations. Computing device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computing device 1105.

Computing device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computing device 1105. In other example implementations, other computing devices may function as or provide the functions of input/user interface 1135 and output device/interface 1140 for a computing device 1105.

Examples of computing device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1105 can be communicatively coupled (e.g., via I/O interface 1125) to external storage 1145 and network 1150 for communicating with any number of networked components, devices, and systems, including one or more computing devices of the same or different configuration. Computing device 1105 or any connected computing device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computing device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Figure 11A:
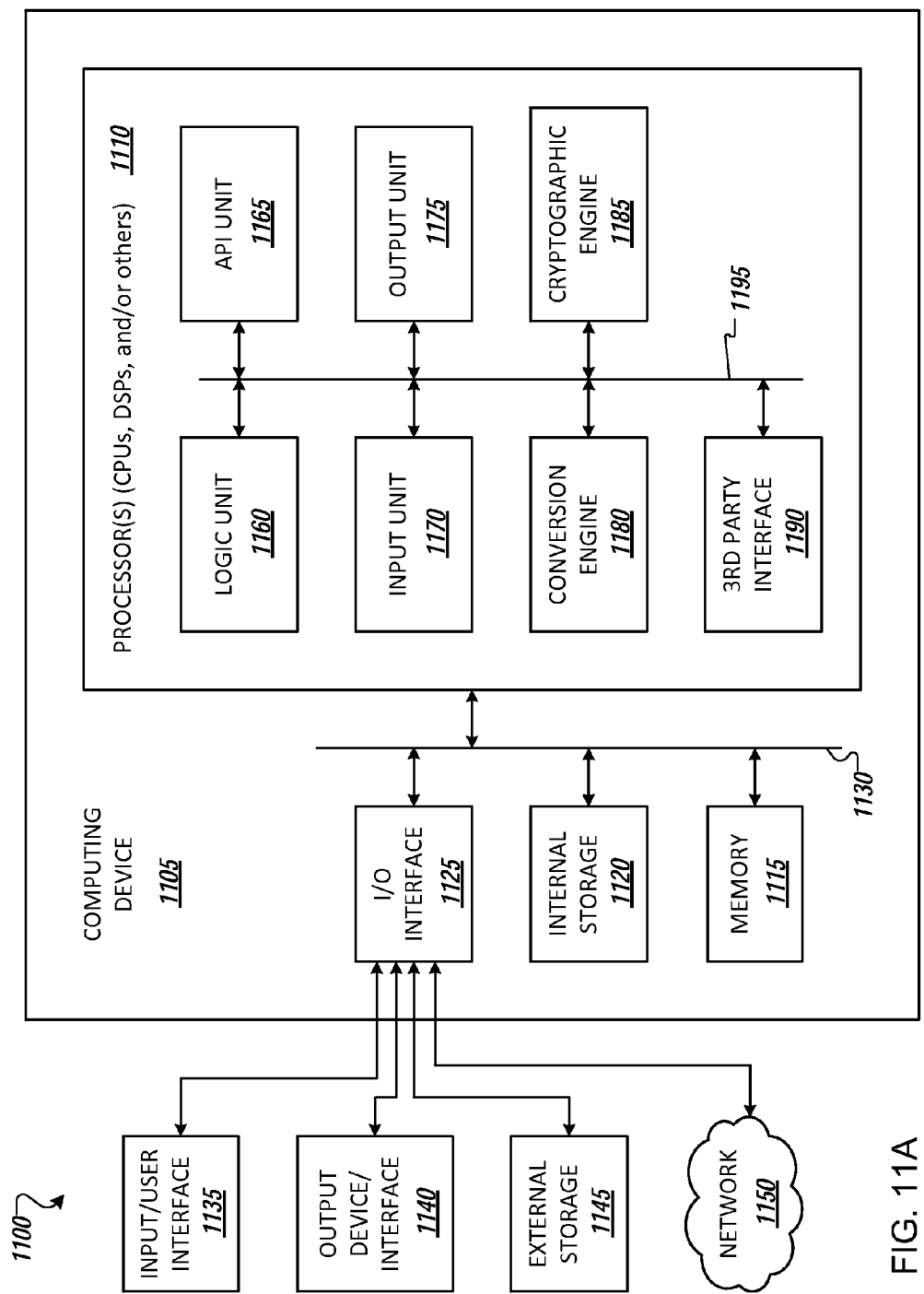
FIGS. 11A-B shows an example computing environment with an example computing device suitable for use in some example implementations for a client (FIG. 11A) and a server (FIG. 11B), respectively.

Specific to FIG. 11A, processor(s) 1110 can execute under any operating system (OS) (not shown), in a native or virtual environment. One or more applications can be deployed that include logic unit 1160, application programming interface (API) unit 1165, input unit 1170, output unit 1175, conversion engine 1180, cryptographic engine 1185, 3rd party interface 1190, and inter-unit communication mechanism 1195 for the different units to communicate with each other, with the OS, and with other applications (not shown). For example, conversion engine 1180, cryptographic engine 1185, and 3rd party interface 1190 may implement one or more processes described and/or shown in FIGS. 7-10. The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175, conversion engine 1180, cryptographic engine 1185, and 3rd party interface 1190). For example, data may be converted from some binary representations to other binary representation at conversion engine 1180, then encrypted at cryptographic engine 1185. The encrypted data and/or other data may be uploaded or sent to a third party service provider using 3rd party interface 1190. Data, which may include encrypted data, may be received from a third party via 3rd party interface 1190. Any encrypted data received can be decrypted at cryptographic engine 1185. If needed, the decrypted data may be converted from some binary representations to other binary representation at conversion engine 1180.

In some instances, logic unit 1160 may be configured to control the information flow among the units and direct the services provided by API unit 1165, input unit 1170, output unit 1175, conversion engine 1180, cryptographic engine 1185, and 3rd party interface 1190 in some example implementations described above. For example, the flow of one or more processes or implementations may be controlled by logic unit 1160 alone or in conjunction with API unit 1165.

Figure 11B:
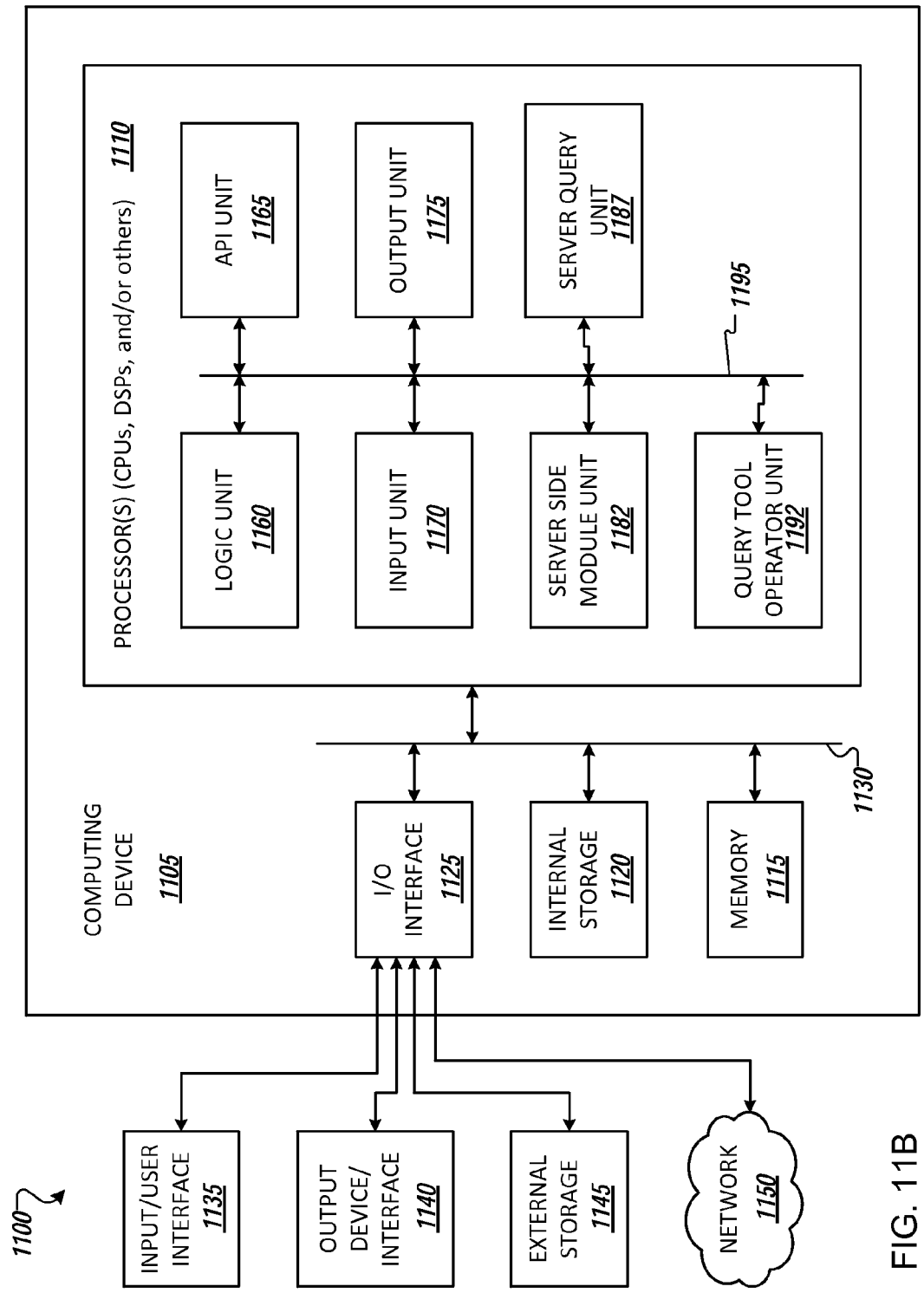

Specific to FIG. 11B, processor(s) 1110 can execute under any operating system (OS) (not shown), in a native or virtual environment. One or more applications can be deployed that include logic unit 1160, application programming interface (API) unit 1165, input unit 1170, output unit 1175, server side module unit 1182, server query unit 1187, query tool operator unit 1192, and inter-unit communication mechanism 1195 for the different units to communicate with each other, with the OS, and with other applications (not shown). For example, server side module unit 1182, server query unit 1187, and query tool operator unit 1192 may implement one or more processes described and/or shown in FIGS. 1-6. The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175, server side module unit 1182, server query unit 1187, and query tool operator unit 1192). For example, the encrypted query may be received via the internet at server side module unit 1182, and a query then may then be parsed, rewritten and constructed by the server query unit 1187. The functions associated with the encryption of the query may be provided by the query tool operator unit 1192. Data, which may include encrypted data, may be the subject of the encrypted query at the server side module unit 1182. The result is provided to the client from the server query unit 1187, without being decrypted.

In some instances, logic unit 1160 may be configured to control the information flow among the units and direct the services provided by API unit 1165, input unit 1170, output unit 1175, server side module unit 1182, server query unit 1187, and query tool operator unit 1192 in some example implementations described above. For example, the flow of one or more processes or implementations may be controlled by logic unit 1160 alone or in conjunction with API unit 1165.

Other Disclosure

The example implementation may have various advantages or benefits. For example, implementing the CSM 103 can be performed independently of the operation of the server query tool 111, and does not require knowledge of the server query tool 111 architecture. Further, the modifications that the CSM 103 performs to queries may be rather minimal and can be computed efficiently. A time consuming operation at the CSM 103 is data modification during data import, but because this is an offline operation, and is rather rare, data modification during data import does not constitute an impediment to implementation of the CSM 103 in an efficient manner, or use of a multiserver architecture for running the CSM 103. The CSM 103 is run on the client side, not at the server infrastructure.

Aspects of the example implementation may have various benefits or advantages. For example, but not by way of limitation, the foregoing operations may be implemented by a database engine at the server, and a cryptographic add-on to the client to achieve security of client data from the server. Further, the operations may focus on fast processing. Additionally, a large set of queries may be covered by a server that can perform the above-described operations for the client without learning the real values of the data items of the client.

As a result, clients (e.g., companies employing the services of the server) may employ the service while hiding only their sensitive data (e.g., 10-15% of the data) and process all of the data efficiently (e.g., 85-90% of the data is not encrypted and may be more quickly processed by cleartext processing; moreover encrypted may be manipulated more quickly. It should be noted that the user interface to the data service may be similar for encrypted and nonencrypted data, as changes in local processing are provided at the add-on, rather than the user interface.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of processing a query, comprising:
   at a client,
   receiving a user-generated query having a plurality of recognizable terms,
   securing the user-generated query to generate an encrypted query, so that the plurality of recognizable terms generated by the user-generated query cannot be determined by a server, the securing comprising converting a numerical value, which one of a signed value and a floating number, is associated with the user-generated query and is encoded in a bit string of a first size to another bit string of a second size that is different from the first size, and encrypting the numerical value in the another bit string to produce a ciphertext;
   transmitting the encrypted query to the server, to perform the query on encrypted data comprising a mix of regular data and secure data previously provided by the client, wherein at least one of selection criteria of the query and identities of selected records of the query result cannot be determined by the server, and
   interpreting a result of the query provided by the server, and providing an output of the query to the user having the plurality of recognizable terms, the interpreting comprising decrypting the ciphertext associated with the result of the query to produce the numerical value encoded in a bit string of the second size, and converting the numerical value to another bit string of the first size, to generate the output of the query to the user.

2. The computer-implemented method of claim 1, wherein the encrypting the numerical value is performed using a public key cryptosystem.

3. The computer-implemented method of claim 1, wherein an add-on is provided at the client to perform the processes at the client.

4. The computer-implemented method of claim 1, wherein the securing comprises encrypting the user-generated query.

5. The computer-implemented method of claim 1, wherein the interpreting comprises decrypting the result.

6. The computer-implemented method of claim 1, wherein the query performed by the server comprises manipulation and matching of the encrypted data.

7. A computer-implemented method of processing a query, comprising:
   at a server,
   receiving an encrypted query provided by a client, wherein recognizable terms generated by the query provided by the client cannot be determined by a server, wherein the encrypted query provided by the client comprises a converted numerical value having one of a signed value and a floating number, being associated with the user-generated query, and being encoded in a bit string of a first size, to another bit string of a second size that is different from the first size, and wherein the numerical value is encrypted in the another bit string to produce a ciphertext;
   performing the query on encrypted data comprising a mix of regular data and secure data previously provided by the client, and
   providing a result of the query to the client, wherein at least one of selection criteria of the query and identities of selected records of the query result cannot be determined by the server, wherein the result of the query is configured to be interpreted by the client by decrypting the ciphertext associated with the result of the query to produce the numerical value encoded in a bit string of the second size, and converting the numerical value to another bit string of the first size, to generate the output of the query to the user.

8. The computer-implemented method of claim 7, wherein for query operations comprising at least one of counting, adding, summing, averaging of the encrypted data, the server performs the aggregation of data also over encrypted rows of data to generate an aggregated encrypted value.

9. The computer-implemented method of claim 7, wherein the result of the query provided to the client is decrypted by the client to generate a cleartext aggregated result, and the server does not have the cryptographic key to decrypt the result of the query.

10. The computer-implemented method of claim 7, wherein the criteria of which record in a row of data to process is based on criteria that is a mix of the regular data and the secure data cryptographically manipulated prior to being provided to the server.

11. A non-transitory computer readable medium having stored therein computer executable instructions executed on a hardware processor, for:
   receiving a user-generated query having a plurality of recognizable terms, securing the user-generated query to generate an encrypted query, so that the plurality of recognizable terms generated by the user-generated query cannot be determined by a server, the securing comprising converting a numerical value, which one of a signed value and a floating number, is associated with the user-generated query and is encoded in a bit string of a first size to another bit string of a second size that is different from the first size, and encrypting the numerical value in the another bit string to produce a ciphertext, transmitting the encrypted query to the server, to perform the query on encrypted data comprising a mix of regular data and secure data previously provided by the client, wherein at least one of selection criteria of the query and identities of selected records of the query result cannot be determined by the server, and interpreting a result of the query provided by the server, and providing an output of the query to the user having the plurality of recognizable terms, the interpreting comprising decrypting the ciphertext associated with the result of the query to produce the numerical value encoded in a bit string of the second size, and converting the numerical value to another bit string of the first size, to generate the output of the query to the user.

12. A non-transitory computer readable medium having stored therein computer executable instructions executed on a hardware processor, for:

receiving an encrypted query provided by a client, wherein recognizable terms generated of by the query provided by the client cannot be determined by a server, wherein the encrypted query provided by the client comprises a converted numerical value having one of a signed value and a floating number, being associated with the user-generated query, and being encoded in a bit string of a first size, to another bit string of a second size that is different from the first size, and wherein the numerical value is encrypted in the another bit string to produce a ciphertext performing the query on encrypted data comprising a mix of regular data and secure data previously provided by the client, and providing a result of the query to the client, wherein at least one of selection criteria of the query and identities of selected records of the query result cannot be determined by the server, wherein the result of the query is configured to be interpreted by the client by decrypting the ciphertext associated with the result of the query to produce the numerical value encoded in a bit string of the second size, and converting the numerical value to another bit string of the first size, to generate the output of the query to the user.

13. A computer-implemented method of processing a query, comprising:

at a client, receiving a user-generated query having a plurality of recognizable terms, securing the user-generated query to generate an encrypted query, so that the plurality of recognizable terms generated by the user-generated query cannot be determined by a server, the securing comprising converting a numerical value, which one of a signed value and a floating number, is associated with the user-generated query and is encoded in a bit string of a first size to another bit string of a second size that is different from the first size, and encrypting the numerical value in the another bit string to produce a ciphertext, transmitting the encrypted query to the server, to perform the query on encrypted data comprising a mix of regular data and secure data previously provided by the client, wherein at least one of selection criteria of the query and identities of selected records of the query result cannot be determined by the server;

at a server, receiving an encrypted query provided by a client, wherein recognizable terms generated of the user-generated query cannot be determined by a server, performing the query on encrypted data comprising a mix of regular data and secure data previously provided by the client, providing a result of the query to the client, wherein at least one of selection criteria of the query and identities of selected records of the query result cannot be determined by the server; and at the client, interpreting a result of the query provided by the server, and providing an output of the query to the user having the plurality of recognizable terms, the interpreting comprising decrypting the ciphertext associated with the result of the query to produce the numerical value encoded in a bit string of the second size, and converting the numerical value to another bit string of the first size, to generate the output of the query to the user.

14. A query processing system comprising:

a client circuitry configured to, receive a user-generated query having a plurality of recognizable terms, secure the user-generated query to generate an encrypted query, so that the plurality of recognizable terms generated by the user-generated query cannot be determined by a server, the secure comprising converting a numerical value, which one of a signed value and a floating number, is associated with the user-generated query and is encoded in a bit string of a first size to another bit string of a second size that is different from the first size, and encrypting the numerical value in the another bit string to produce a ciphertext, and transmit the encrypted query to the server, to perform the query on encrypted data comprising a mix of regular data and secure data previously provided by the client, wherein at least one of selection criteria of the query and identities of selected records of the query result cannot be determined by the server;

a server circuitry configured to, receive an encrypted query provided by a client, wherein recognizable terms generated of the user-generated query cannot be determined by a server, perform the query on encrypted data comprising a mix of regular data and secure data previously provided by the client, and provide a result of the query to the client, wherein at least one of selection criteria of the query and identities of selected records of the query result cannot be determined by the server; and the client circuitry further configured to, interpret a result of the query provided by the server, and providing an output of the query to the user having the plurality of recognizable terms, the interpret comprising decrypting the ciphertext associated with the result of the query to produce the numerical value encoded in a bit string of the second size, and converting the numerical value to another bit string of the first size, to generate the output of the query to the user.

15. The query processing system of claim 14, further comprising a server query tool that constructs the query for the server, based on the encrypted query provided by the client.

16. The query processing system of claim 14, further comprising an add-on at the client that is configured to secure the user-generated query and transmit the encrypted query, and a query tool operator at the server as an add-on that is configured to construct the encrypted query for the server to perform the query on the encrypted data.

* * * * *